US011863272B2

(12) United States Patent
Hao et al.

(10) Patent No.: US 11,863,272 B2
(45) Date of Patent: Jan. 2, 2024

(54) CHANNEL STATE INFORMATION FEEDBACK FOR SEMI-OPEN-LOOP AND OPEN-LOOP SCHEMES

(71) Applicant: QUALCOMM Incorporated, San Diego, CA (US)

(72) Inventors: Chenxi Hao, Beijing (CN); Juan Montojo, San Diego, CA (US); Yu Zhang, Beijing (CN); Chao Wei, Beijing (CN); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/887,958

(22) Filed: Aug. 15, 2022

(65) Prior Publication Data
US 2022/0399924 A1 Dec. 15, 2022

Related U.S. Application Data

(63) Continuation of application No. 16/621,390, filed as application No. PCT/CN2018/091323 on Jun. 14, 2018, now Pat. No. 11,483,049.

(30) Foreign Application Priority Data

Jun. 16, 2017 (WO) ................ PCT/CN2017/088607

(51) Int. Cl.
H04B 7/06 (2006.01)
H04W 76/27 (2018.01)
H04W 72/23 (2023.01)
(52) U.S. Cl.
CPC ........... H04B 7/0632 (2013.01); H04B 7/063 (2013.01); H04B 7/0626 (2013.01);
(Continued)

(58) Field of Classification Search
CPC .... H04B 7/0632; H04B 7/0626; H04B 7/063; H04B 7/0639; H04W 72/042; H04W 76/27
(Continued)

(56) References Cited

U.S. PATENT DOCUMENTS 9,225,409 B2 12/2015 Liu et al.
9,854,490 B2 * 12/2017 Davydov .............. H04W 76/11
(Continued)

FOREIGN PATENT DOCUMENTS

CN 104243003 A 12/2014
CN 105723769 A 6/2016
(Continued)

OTHER PUBLICATIONS

Intel Corporation: "Discussion on Transmission Scheme 2 for DL", 3GPP TSG RAN WG1 #89, R1-1707348, Hangzhou, P.R. China, May 19, 2017, 11 pages.
(Continued)

Primary Examiner — Helene E Tayong
(74) Attorney, Agent, or Firm — Holland & Hart

(57) ABSTRACT

The described techniques relate to improved methods, systems, devices, or apparatuses that support channel state information feedback for semi-open-loop and open-loop schemes. The described techniques provide for a user equipment (UE) to determine an open-loop, semi-open-loop, or closed-loop transmission scheme for deriving channel quality information (CQI). In the case of determined open-loop transmission scheme, the UE may select a transmission scheme corresponding to a time offset value and a precoder cycling granularity value. The UE may determine one or more of a time offset value, a precoder cycling granularity value, and a precoding matrix indicator (PMI) for a channel state information (CSI) report, and generate CQI accord- (Continued)

ingly. Additionally, the UE may include the determined values in the CSI report to indicate the transmission scheme used for the CQI derivation. Based on the CQI, the base station can then determine the transmission scheme and perform link adaption accordingly.

12 Claims, 16 Drawing Sheets

(52) U.S. Cl.
CPC .......... *H04B 7/0639* (2013.01); *H04W 72/23* (2023.01); *H04W 76/27* (2018.02)

(58) Field of Classification Search
USPC .......................................... 370/239
See application file for complete search history.

(56) References Cited

U.S. PATENT DOCUMENTS

| | | | |
|---|---|---|---|
| 2011/0149765 A1* | 6/2011 | Gorokhov | H04L 1/0026 370/252 |
| 2012/0270535 A1 | 10/2012 | Chen et al. | |
| 2013/0064207 A1 | 3/2013 | Wang et al. | |
| 2013/0077523 A1 | 3/2013 | Ko et al. | |
| 2014/0185699 A1 | 7/2014 | Zhang et al. | |
| 2014/0241274 A1 | 8/2014 | Lee et al. | |
| 2015/0222341 A1 | 8/2015 | Ko et al. | |
| 2015/0229454 A1 | 8/2015 | Takeda et al. | |
| 2016/0301454 A1 | 10/2016 | Nayeb et al. | |
| 2016/0309437 A1 | 10/2016 | Tang et al. | |
| 2016/0381697 A1 | 12/2016 | Wu et al. | |
| 2017/0134080 A1 | 5/2017 | Rahman et al. | |
| 2017/0134082 A1* | 5/2017 | Onggosanusi | H04B 7/0639 |
| 2018/0062715 A1 | 3/2018 | Li et al. | |
| 2020/0145075 A1 | 5/2020 | Hae et al. | |

FOREIGN PATENT DOCUMENTS

| | | |
|---|---|---|
| CN | 106033986 A | 10/2016 |
| CN | 106301509 A | 1/2017 |
| EP | 3273610 A1 | 1/2018 |
| WO | WO2015135157 A1 | 9/2015 |
| WO | WO-2015176209 A1 | 11/2015 |
| WO | WO2016163819 A1 | 10/2016 |
| WO | WO2017076347 A1 | 5/2017 |

OTHER PUBLICATIONS

International Preliminary Report on Patentability—PCT/CN2017/088607, The International Bureau of WIPO—Geneva, Switzerland, dated Dec. 26, 2019.
International Preliminary Report on Patentability—PCT/CN2018/091323, The International Bureau of WIPO—Geneva, Switzerland, dated Dec. 26, 2019.
International Search Report and Written Opinion—PCT/CN2017/088607—ISA/EPO—dated Feb. 24, 2018.
International Search Report and Written Opinion—PCT/CN2018/091323—ISA/EPO—dated Sep. 7, 2018.
Qualcomm Incorporated: "On DL Transmission Schemes 2", 3GPP Draft, 3GPP TSG RAN WG1 RAN1 #89, R1-1709734, 3rd Generation Partnership Project (3GPP), Mobile Competence Centre; 650, Route Des Lucioles; F-06921 Sophia-Antipolis Cedex; France, vol. RAN WG1, No. Hangzhou, China; May 15, 2017-May 19, 2017, May 19, 2017 (May 19, 2017), XP051285495, pp. 1-6, Retrieved from the Internet: URL: http://www.3gpp.org/ftp/tsg_ran/WG1_RL1/TSGR1_89/Docs/, [retrieved on May 19, 2017], Section 2.3; p. 4, table 2.
Samsung: "DMRS-based Spatial Multiplexing for DL NR MIMO", R1-1700896, 3GPP TSG RAN WG1 NR Ad-Hoc, Spokane, USA, Jan. 20, 2017, 3 pages.
Supplementary European Search Report—EP18817887—Search Authority—Munich—dated Feb. 3, 2021.

\* cited by examiner

CHANNEL STATE INFORMATION FEEDBACK FOR SEMI-OPEN-LOOP AND OPEN-LOOP SCHEMES

CROSS REFERENCES

The present application for patent is a Continuation of U.S. patent application Ser. No. 16/621,390 by Hao et al., entitled "Channel State Information Feedback for Semi-Open-Loop and Open Loop Schemes" filed Dec. 11, 2019, which is a 371 national stage application of PCT International Patent Application No. PCT/CN2018/091323 by Hao et al., entitled "Channel State Information Feedback for Semi-Open-Loop and Open Loop Schemes" filed Jun. 14, 2018, and claims the benefit of PCT International Patent Application No. PCT/CN2017/088607 by Hao et al., entitled "Channel State Information Feedback for Semi-Open-Loop and Open Loop Schemes," filed Jun. 16, 2017, each of which is assigned to the assignee hereof, and each of which is expressly incorporated by reference in its entirety.

INTRODUCTION

The following relates generally to wireless communication, and more specifically to channel state information feedback for semi-open-loop and open-loop schemes.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Transmission schemes in some wireless communications systems may be classified into open-loop, semi-open-loop, and closed-loop transmission schemes. In open-loop and semi-open-loop transmission, data and reference signals may not be restricted to being transmitted with the same precoding matrix. Further, different techniques may be used for open-loop precoding matrix indicator (PMI) reporting, including full PMI reporting, partial PMI reporting, and no PMI reporting. These various options may, in some cases, result in ambiguities in determining whether channel quality information (CQI) is based on an open-loop (or semi-open-loop) or closed-loop transmission schemes, and ambiguities in the assumptions made in calculating associated PMI reporting.

SUMMARY

The described techniques relate to improved methods, systems, devices, or apparatuses that support channel state information feedback for semi-open-loop and open-loop schemes. The described techniques provide for a user equipment (UE) to determine an open-loop, semi-open-loop, or closed-loop transmission scheme for deriving a channel quality indication (CQI). In the case of a determined open-loop transmission scheme, the UE may select a transmission scheme corresponding to a time offset value and a precoder cycling granularity value. For example, the transmission scheme may be a small cyclic delay diversity (SCDD) scheme, resource block group (RBG) level precoder cycling scheme, or a combination thereof. The UE may then, depending on its chosen transmission scheme, determine one or more of a time offset value, a precoder cycling granularity value, and a precoding matrix indicator (PMI) matrix for channel state information (CSI), and generate CQI accordingly. Additionally, the UE may transmit the CQI to a base station in a CSI report, and may include the determined values to indicate the transmission scheme used for the CQI derivation. Based on the CQI, the base station may determine the transmission scheme and perform link adaption accordingly.

A method of wireless communications at a UE is described. The method may include determining at least one of a time offset value between two or more antenna ports or a precoder cycling granularity value associated with a transmission scheme for CQI, generating the CQI based on at least one of the determined time offset value or the determined precoder cycling granularity value, and transmitting, in a CSI report, the generated CQI.

An apparatus for wireless communications at a UE is described. The apparatus may include a processor, memory in electronic communication with the processor, and instructions stored in the memory. The instructions may be executable by the processor to cause the apparatus to determine at least one of a time offset value between two or more antenna ports or a precoder cycling granularity value associated with a transmission scheme for CQI, generate the CQI based on at least one of the determined time offset value or the determined precoder cycling granularity value, and transmit, in a CSI report, the generated CQI.

Another apparatus for wireless communications at a UE is described. The apparatus may include means for determining at least one of a time offset value between two or more antenna ports or a precoder cycling granularity value associated with a transmission scheme for CQI, generating the CQI based on at least one of the determined time offset value or the determined precoder cycling granularity value, and transmitting, in a CSI report, the generated CQI.

A non-transitory computer-readable medium storing code for wireless communications at a UE is described. The code may include instructions executable by a processor to determine at least one of a time offset value between two or more antenna ports or a precoder cycling granularity value associated with a transmission scheme for CQI, generate the CQI based on at least one of the determined time offset value or the determined precoder cycling granularity value, and transmit, in a CSI report, the generated CQI.

Some examples of the method, apparatuses, and non-transitory computer-readable medium described herein may further include operations, features, means, or instructions for determining the transmission scheme for CQI, where the transmission scheme for CQI includes a first transmission scheme or a second transmission scheme, and determining at least one of the time offset value or the precoder cycling granularity value includes determining that the time offset value may be equal to zero, or the precoder cycling granularity value may be equal to a non-cycling indicator, or a combination thereof, where the determined transmission scheme may be the first transmission scheme.

Some examples of the method, apparatuses, and non-transitory computer-readable medium described herein may further include operations, features, means, or instructions for determining the transmission scheme for CQI, where the transmission scheme for CQI includes a first transmission scheme or a second transmission scheme, and determining at least one of the time offset value or the precoder cycling granularity value includes determining that the time offset value may be greater than zero, or the precoder cycling granularity value may be equal to a non-cycling indicator, or a combination thereof; or determining that the time offset value may be equal to zero, or the precoder cycling granularity value may be not equal to a non-cycling indicator, or a combination thereof, where the determined transmission scheme may be the second transmission scheme.

In some examples of the method, apparatuses, and non-transitory computer-readable medium described herein, at least one of the time offset value or the precoder cycling granularity value may be determined based on a precoder granularity associated with a data channel, a UE mobility parameter, a delay spread, or a combination thereof.

In some examples of the method, apparatuses, and non-transitory computer-readable medium described herein, at least one of the time offset value or the precoder cycling granularity value may be configured via a medium access control (MAC) control element (CE), or a radio resource control (RRC) message, or downlink control information (DCI).

In some examples of the method, apparatuses, and non-transitory computer-readable medium described herein, determining at least one of the time offset value or the precoder cycling granularity value may include operations, features, means, or instructions for selecting the time offset value from a predetermined set of time offset values and selecting the precoder cycling granularity value from a predetermined set of precoder cycling granularity values.

In some examples of the method, apparatuses, and non-transitory computer-readable medium described herein, the predetermined set of precoder cycling granularity values includes multiples of a number of resource blocks (RBs) and a non-cycling indicator, and a maximum multiple of the number of RBs may be less than or equal to a smallest frequency granularity for CSI feedback and the non-cycling indicator may be equal to zero.

In some examples of the method, apparatuses, and non-transitory computer-readable medium described herein, the predetermined set of precoder cycling granularity values include a portion of a number of RBs for CSI feedback and a non-cycling indicator, and the non-cycling indicator may be equal to one.

Some examples of the method, apparatuses, and non-transitory computer-readable medium described herein may further include operations, features, means, or instructions for determining at least one of the predetermined set of time offset values and the predetermined set of precoder cycling granularity values based on a capability associated with the UE; or and receiving the predetermined set of time offset values and the predetermined set of precoder cycling granularity values via a MAC CE, or a RRC message, or DCI.

In some examples of the method, apparatuses, and non-transitory computer-readable medium described herein, generating the CQI may include operations, features, means, or instructions for determining a PMI reporting scheme based on a quantity associated with the CSI report, where the PMI reporting scheme includes full PMI reporting, partial PMI reporting, or no PMI reporting and deriving the CQI based on the determined PMI reporting scheme, a rank indicator (RI), or combination thereof.

In some examples of the method, apparatuses, and non-transitory computer-readable medium described herein, the two or more antenna ports include a first group of CSI-reference signal (CSI-RS) ports and a second group of CSI-RS ports, and generating the CQI includes applying the time offset value to the second group of CSI-RS ports relative to the first group of CSI-RS ports.

Some examples of the method, apparatuses, and non-transitory computer-readable medium described herein may further include operations, features, means, or instructions for transmitting, in the CSI report, at least one of the time offset value or the precoder cycling granularity value with the generated CQI.

In some examples of the method, apparatuses, and non-transitory computer-readable medium described herein, transmitting at least one of the time offset value and the precoder cycling granularity value may include operations, features, means, or instructions for jointly coding the time offset value or the precoder cycling granularity value with a RI within the CSI report, or jointly coding the time offset value or the precoder cycling granularity value within the CSI report.

Some examples of the method, apparatuses, and non-transitory computer-readable medium described herein may further include operations, features, means, or instructions for determining the transmission scheme for CQI, where the transmission scheme for CQI includes a first transmission scheme or a second transmission scheme, where the first transmission scheme includes a closed-loop transmission scheme and the second transmission scheme includes a semi-open-loop transmission scheme or an open-loop transmission scheme.

In some examples of the method, apparatuses, and non-transitory computer-readable medium described herein, generating the CQI may include operations, features, means, or instructions for applying a first precoder for a first RBG and a second precoder for a second RBG, where a size of the first RBG and a size of the second RBG may be equal to the determined precoder cycling granularity value.

A method of wireless communications at a base station is described. The method may include receiving CQI in a CSI report, the CQI based on at least one of a time offset value between two or more antenna ports or a precoder cycling granularity value, determining a transmission scheme used for generating the CQI based on at least one of the time offset value or the precoder cycling granularity value, and performing link adaptation based on the determined transmission scheme and the CSI report.

An apparatus for wireless communications at a base station is described. The apparatus may include a processor, memory in electronic communication with the processor, and instructions stored in the memory. The instructions may be executable by the processor to cause the apparatus to receive CQI in a CSI report, the CQI based on at least one of a time offset value between two or more antenna ports or a precoder cycling granularity value, determine a transmission scheme used for generating the CQI based on at least one of the time offset value or the precoder cycling granularity value, and perform link adaptation based on the determined transmission scheme and the CSI report.

Another apparatus for wireless communications at a base station is described. The apparatus may include means for receiving CQI in a CSI report, the CQI based on at least one of a time offset value between two or more antenna ports or a precoder cycling granularity value, determining a transmission scheme used for generating the CQI based on at least one of the time offset value or the precoder cycling granularity value, and performing link adaptation based on the determined transmission scheme and the CSI report.

A non-transitory computer-readable medium storing code for wireless communications at a base station is described. The code may include instructions executable by a processor to receive CQI in a CSI report, the CQI based on at least one of a time offset value between two or more antenna ports or a precoder cycling granularity value, determine a transmission scheme used for generating the CQI based on at least one of the time offset value or the precoder cycling granularity value, and perform link adaptation based on the determined transmission scheme and the CSI report.

In some examples of the method, apparatuses, and non-transitory computer-readable medium described herein, generating the CQI may include operations, features, means, or instructions for determining a PMI reporting scheme, where the PMI reporting scheme includes full PMI reporting, partial PMI reporting, or no PMI reporting and deriving the CQI based on the determined PMI reporting scheme.

Some examples of the method, apparatuses, and non-transitory computer-readable medium described herein may further include operations, features, means, or instructions for receiving at least one of the time offset value or the precoder cycling granularity value, where the CQI may be assumed to be associated with at least one of the received time offset value or the received precoder cycling granularity value.

Some examples of the method, apparatuses, and non-transitory computer-readable medium described herein may further include operations, features, means, or instructions for configuring at least one of the time offset value or the precoder cycling granularity value via a MAC CE, or a RRC message, or DCI.

In some examples of the method, apparatuses, and non-transitory computer-readable medium described herein, the transmission scheme includes a first transmission scheme or a second transmission scheme, and determining the transmission scheme used for generating the CQI includes identifying that the time offset value may be greater than zero, or the precoder cycling granularity value may be equal to a non-cycling indicator, or a combination thereof, where the determined transmission scheme may be the second transmission scheme.

In some examples of the method, apparatuses, and non-transitory computer-readable medium described herein, the transmission scheme includes a first transmission scheme or a second transmission scheme, and determining the transmission scheme used for generating the CQI includes identifying that the time offset value may be equal to zero, or the precoder cycling granularity value may be not equal to a non-cycling indicator, or a combination thereof, where the determined transmission scheme may be the second transmission scheme.

In some examples of the method, apparatuses, and non-transitory computer-readable medium described herein, the transmission scheme includes a first transmission scheme or a second transmission scheme, and determining the transmission scheme used for generating the CQI includes identifying that the time offset value may be greater than zero, or the precoder cycling granularity value may be not equal to a non-cycling indicator, or a combination thereof, where the determined transmission scheme may be the second transmission scheme.

Some examples of the method, apparatuses, and non-transitory computer-readable medium described herein may further include operations, features, means, or instructions for transmitting an indication of a predetermined set of time offset values and an indication of a predetermined set of precoder cycling granularity values via a MAC CE, or a RRC message, or DCI.

In some examples of the method, apparatuses, and non-transitory computer-readable medium described herein, the predetermined set of precoder cycling granularity values includes multiples of a number of RBs and a non-cycling indicator, and where a maximum multiple of the number of RBs may be less than or equal to a smallest frequency granularity for CSI feedback and the non-cycling indicator may be equal to zero.

In some examples of the method, apparatuses, and non-transitory computer-readable medium described herein, the predetermined set of precoder cycling granularity values include a portion of a number of RBs for CSI feedback and a non-cycling indicator, and where the non-cycling indicator may be equal to one.

In some examples of the method, apparatuses, and non-transitory computer-readable medium described herein, the CQI may be based on a PMI reporting scheme and at least one of the time offset value or the precoder cycling granularity value, and the CSI report includes a RI, a PMI, the time offset value, the precoder cycling granularity value, or a combination thereof, and the time offset value and the precoder cycling granularity value may be jointly coded with the RI within the CSI report.

In some examples of the method, apparatuses, and non-transitory computer-readable medium described herein, the two or more antenna ports include a first group of CSI-RS ports and a second group of CSI-RS ports, and generating the CQI includes applying the time offset value to the second group of CSI-RS ports relative to the first group of CSI-RS ports.

In some examples of the method, apparatuses, and non-transitory computer-readable medium described herein, receiving the CQI may include operations, features, means, or instructions for receiving the CQI having a first precoder applied for a first RBG and a second precoder applied for a second RBG, where a size of the first RBG and a size of the second RBG may be equal to the precoder cycling granularity value.

A method of wireless communication is described. The method may include determining a transmission scheme for CQI, where the transmission scheme includes a first transmission scheme or a second transmission scheme, determining a time offset value and a precoder cycling granularity value associated with the determined transmission scheme, generating the CQI based at least in part on the determined transmission scheme, and transmitting, in a CSI report, the identified time offset value and the precoder cycling granularity value with the generated CQI.

An apparatus for wireless communication is described. The apparatus may include means for determining a transmission scheme for CQI, where the transmission scheme includes a first transmission scheme or a second transmission scheme, means for determining a time offset value and a precoder cycling granularity value associated with the determined transmission scheme, means for generating the CQI based at least in part on the determined transmission scheme, and means for transmitting, in a CSI report, the identified time offset value and the precoder cycling granularity value with the generated CQI.

Another apparatus for wireless communication is described. The apparatus may include a processor, memory in electronic communication with the processor, and instructions stored in the memory. The instructions may be operable to cause the processor to determine a transmission scheme for CQI, where the transmission scheme includes a first transmission scheme or a second transmission scheme, determine a time offset value and a precoder cycling granularity value associated with the determined transmission scheme, generate the CQI based at least in part on the determined transmission scheme, and transmit, in a CSI report, the identified time offset value and the precoder cycling granularity value with the generated CQI.

A non-transitory computer readable medium for wireless communication is described. The non-transitory computer-readable medium may include instructions operable to cause a processor to determine a transmission scheme for CQI, where the transmission scheme includes a first transmission scheme or a second transmission scheme, determine a time offset value and a precoder cycling granularity value associated with the determined transmission scheme, generate the CQI based at least in part on the determined transmission scheme, and transmit, in a CSI report, the identified time offset value and the precoder cycling granularity value with the generated CQI.

In some examples of the method, apparatus, and non-transitory computer-readable medium described above, determining the time offset value and the precoder cycling granularity value includes determining that the time offset value may be equal to zero and the precoder cycling granularity value may be equal to a non-cycling indicator, where the determined transmission scheme may be the first transmission scheme.

In some examples of the method, apparatus, and non-transitory computer-readable medium described above, determining the time offset value and the precoder cycling granularity value includes determining that the time offset value may be greater than zero and the precoder cycling granularity value may be equal to a non-cycling indicator, where the determined transmission scheme may be the second transmission scheme including SCDD.

In some examples of the method, apparatus, and non-transitory computer-readable medium described above, determining the time offset value and the precoder cycling granularity value includes determining that the time offset value may be equal to zero and the precoder cycling granularity value may be not equal to a non-cycling indicator, where the determined transmission scheme may be the second transmission scheme including RBG level precoder cycling. In some examples of the method, apparatus, and non-transitory computer-readable medium described above, determining the time offset value and the precoder cycling granularity value includes determining that the time offset value may be greater than zero and the precoder cycling granularity value may be not equal to a non-cycling indicator, where the determined transmission scheme may be the second transmission scheme including SCDD and RBG level precoder cycling.

In some examples of the method, apparatus, and non-transitory computer-readable medium described above, determining the time offset value and the precoder cycling granularity value includes selecting the time offset value from a predetermined set of time offset values. Some examples of the method, apparatus, and non-transitory computer-readable medium described above may further include processes, features, means, or instructions for selecting the precoder cycling granularity value from a predetermined set of precoder cycling granularity values.

In some examples of the method, apparatus, and non-transitory computer-readable medium described above, the predetermined set of precoder cycling granularity values include a portion of a number of RBs for CSI feedback and a non-cycling indicator, and where the non-cycling indicator may be equal to one. Some examples of the method, apparatus, and non-transitory computer-readable medium described above may further include processes, features, means, or instructions for receiving the predetermined set of time offset values and the predetermined set of precoder cycling granularity values via a MAC CE, or a RRC message, or DCI.

In some examples of the method, apparatus, and non-transitory computer-readable medium described above, generating the CQI includes determining a PMI reporting scheme, and where the PMI reporting scheme includes full PMI reporting, partial PMI reporting, or no PMI reporting. Some examples of the method, apparatus, and non-transitory computer-readable medium described above may further include processes, features, means, or instructions for deriving the CQI based at least in part on the determined PMI reporting scheme.

Some examples of the method, apparatus, and non-transitory computer-readable medium described above may further include processes, features, means, or instructions for deriving the CQI based at least in part on a RI, a first PMI matrix, a second PMI matrix, the determined time offset value, and the precoder cycling granularity value equal to a non-cycling indicator, where the PMI reporting scheme includes full PMI reporting.

Some examples of the method, apparatus, and non-transitory computer-readable medium described above may further include processes, features, means, or instructions for determining that a CSR may be configured. Some examples of the method, apparatus, and non-transitory computer-readable medium described above may further include processes, features, means, or instructions for deriving the CQI based at least in part on the CSR.

Some examples of the method, apparatus, and non-transitory computer-readable medium described above may further include processes, features, means, or instructions for deriving the CQI based at least in part on a RI, a first PMI matrix or a component of the first PMI matrix, and the determined time offset value and the precoder cycling granularity value, where the PMI reporting scheme includes partial PMI reporting.

Some examples of the method, apparatus, and non-transitory computer-readable medium described above may further include processes, features, means, or instructions for determining that a CSR may be configured. Some examples of the method, apparatus, and non-transitory computer-readable medium described above may further include processes, features, means, or instructions for deriving the CQI based at least in part on the CSR.

Some examples of the method, apparatus, and non-transitory computer-readable medium described above may further include processes, features, means, or instructions for deriving the CQI based at least in part on a RI and the determined time offset value and the precoder cycling granularity value, where the PMI reporting scheme includes no PMI reporting.

Some examples of the method, apparatus, and non-transitory computer-readable medium described above may further include processes, features, means, or instructions for determining that a CSR may be configured. Some examples of the method, apparatus, and non-transitory computer-readable medium described above may further include processes, features, means, or instructions for deriving the CQI based at least in part on the CSR. In some examples of the method, apparatus, and non-transitory computer-readable medium described above, transmitting the identified time offset value and the precoder cycling granularity value includes jointly coding the identified time offset value and the precoder cycling granularity value with a RI within the CSI report.

In some examples of the method, apparatus, and non-transitory computer-readable medium described above, transmitting the identified time offset value and the precoder cycling granularity value includes jointly coding the identified time offset value and the precoder cycling granularity value within the CSI report. In some examples of the method, apparatus, and non-transitory computer-readable medium described above, the first transmission scheme includes a closed-loop transmission scheme and the second transmission scheme includes a semi-open-loop transmission scheme or an open-loop transmission scheme.

A method of wireless communication is described. The method may include receiving, in a CSI report, an RI, a PMI, a time offset value, and a precoder cycling granularity value with CQI, determining a transmission scheme used for generating the CQI based on the received time offset value and the precoder cycling granularity value, where the transmission scheme includes a first transmission scheme or a second transmission scheme, and performing link adaptation based at least in part on the determined transmission scheme and the CSI report.

An apparatus for wireless communication is described. The apparatus may include means for receiving, in a CSI report, an RI, a PMI, a time offset value, and a precoder cycling granularity value with CQI, means for determining a transmission scheme used for generating the CQI based on the received time offset value and the precoder cycling granularity value, where the transmission scheme includes a first transmission scheme or a second transmission scheme, and means for performing link adaptation based at least in part on the determined transmission scheme and the CSI report.

Another apparatus for wireless communication is described. The apparatus may include a processor, memory in electronic communication with the processor, and instructions stored in the memory. The instructions may be operable to cause the processor to receive, in a CSI report, an RI, a PMI, a time offset value, and a precoder cycling granularity value with CQI, determine a transmission scheme used for generating the CQI based on the received time offset value and the precoder cycling granularity value, where the transmission scheme includes a first transmission scheme or a second transmission scheme, and perform link adaptation based at least in part on the determined transmission scheme and the CSI report.

A non-transitory computer readable medium for wireless communication is described. The non-transitory computer-readable medium may include instructions operable to cause a processor to receive, in a CSI report, a RI, a PMI, a time offset value, and a precoder cycling granularity value with CQI, determine a transmission scheme used for generating the CQI based on the received time offset value and the precoder cycling granularity value, where the transmission scheme includes a first transmission scheme or a second transmission scheme, and perform link adaptation based at least in part on the determined transmission scheme and the CSI report.

In some examples of the method, apparatus, and non-transitory computer-readable medium described above, determining the transmission scheme used for generating the CQI includes identifying that the time offset value may be equal to zero and the precoder cycling granularity value may be equal to a non-cycling indicator, where the determined transmission scheme may be the first transmission scheme.

In some examples of the method, apparatus, and non-transitory computer-readable medium described above, determining the transmission scheme used for generating the CQI includes identifying that the time offset value may be greater than zero and the precoder cycling granularity value may be equal to a non-cycling indicator, where the determined transmission scheme may be the second transmission scheme including SCDD. In some examples of the method, apparatus, and non-transitory computer-readable medium described above, determining the transmission scheme used for generating the CQI includes identifying that the time offset value may be equal to zero and the precoder cycling granularity value may be not equal to a non-cycling indicator, where the determined transmission scheme may be the second transmission scheme including RBG-level precoder cycling.

In some examples of the method, apparatus, and non-transitory computer-readable medium described above, determining the transmission scheme used for generating the CQI includes identifying that the time offset value may be greater than zero and the precoder cycling granularity value may be not equal to a non-cycling indicator, where the determined transmission scheme may be the second transmission scheme including SCDD and RBG-level precoder cycling.

In some examples of the method, apparatus, and non-transitory computer-readable medium described above, the predetermined set of precoder cycling granularity values includes multiples of a number of RBs and a non-cycling indicator, and where a maximum multiple of the number of RBs may be less than or equal to a smallest frequency granularity for CSI feedback and the non-cycling indicator may be equal to zero. In some examples of the method, apparatus, and non-transitory computer-readable medium described above, the predetermined set of precoder cycling granularity values include a portion of a number of RBs for CSI feedback and a non-cycling indicator, and where the non-cycling indicator may be equal to one.

In some examples of the method, apparatus, and non-transitory computer-readable medium described above, the CQI may be based at least in part on a PMI reporting scheme and the time offset value and the precoder cycling granularity value. In some examples of the method, apparatus, and non-transitory computer-readable medium described above, the time offset value and the precoder cycling granularity value may be jointly coded with the RI within the CSI report.

In some examples of the method, apparatus, and non-transitory computer-readable medium described above, the time offset value and the precoder cycling granularity value may be jointly coded within the CSI report. In some examples of the method, apparatus, and non-transitory computer-readable medium described above, the first transmission scheme includes a closed-loop transmission scheme and the second transmission scheme includes a semi-open-loop transmission scheme or an open-loop transmission scheme.

DETAILED DESCRIPTION

Figure 1:
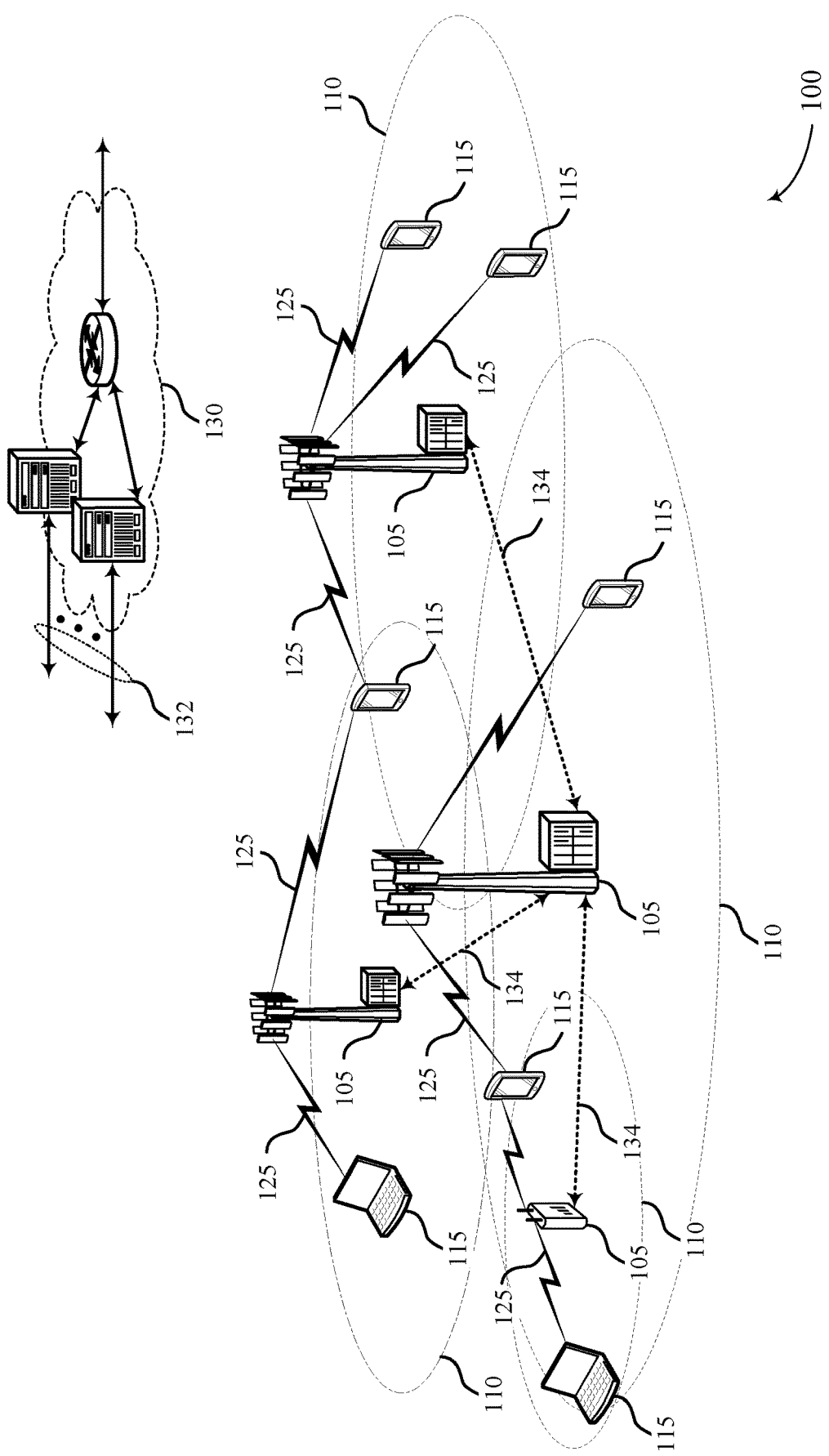
FIG. 1 illustrates an example of a wireless communications system in accordance with aspects of the present disclosure.

A wireless communications system may support communication between a base station and a user equipment (UE). Specifically, the wireless communications system may support downlink transmissions from the base station to the UE and uplink transmissions from the UE to a base station. Downlink transmissions may include data, control signals, and reference signals. Different reference signal waveforms may be multiplexed over a set of frequency resources (i.e., using frequency division multiplexing (FDM) and/or time division multiplexing (TDM)) for a given uplink transmission on an antenna. For example, a base station may identify respective single-carrier reference signal streams to be transmitted to a UE, and these streams may be precoded for the transmission.

Transmission schemes utilized in a wireless communications system may be classified into open-loop, semi-open-loop, and closed-loop schemes. For example, if there is no precoding matrix indicator (PMI) feedback, a transmission scheme may be considered open-loop, whereas if there is at least partial PMI feedback, the scheme may be considered semi-open-loop. In open-loop and semi-open-loop transmissions, data and reference signals may or may not be restricted to be transmitted with the same precoding matrix. Further, different reporting schemes may be used for open-loop PMI reporting, including full PMI reporting, partial PMI reporting, and no PMI reporting. A method may thus provide for indicating whether channel quality information (CQI) is based on a closed-loop or open-loop transmission scheme, and for performing CQI computations using consistent assumptions based on the type of PMI reporting.

As described herein, a UE may select a transmission scheme, and may report an indication of a time offset between multiple virtual antennas and a precoder cycling granularity transmission value that may be associated with the transmission scheme. The selected transmission scheme may be a closed-loop scheme or an open-loop (or semi-open-loop) scheme, where open-loop schemes may further include small cyclic delay diversity (SCDD) and resource block group (RBG) level precoder cycling schemes, or a combination thereof. Then, using the selected transmission scheme, the UE may compute an associated CQI. The CQI may further be derived based on a PMI matrix, depending on whether the PMI reporting technique is a full PMI reporting technique, a partial PMI reporting technique, or a no PMI reporting technique. The UE may indicate the calculated CQI and the respective values of a time offset value (e.g., $\tau$) and a precoder cycling granularity value (e.g., M) associated with the transmission scheme to a base station, in, for example, a channel state information (CSI) report. The base station may adjust its transmission scheme and perform link adaptation accordingly. In some cases, joint coding may be used for coding of the time offset value and the precoder cycling granularity value in the CSI reporting.

Aspects of the disclosure are initially described in the context of a wireless communications system. These and other features are further illustrated by and described with reference to various block diagrams, transmission schemes, and process flows. Aspects of the disclosure are further illustrated by and described with reference to apparatus diagrams, system diagrams, and flowcharts that relate to CSI feedback for semi-open-loop and open-loop schemes.

FIG. 1 illustrates an example of a wireless communications system 100 in accordance with aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. Wireless communications system 100 may enable or support methods for indicating whether CQI is based on a closed-loop or open-loop transmission scheme, and for performing CQI computations using assumptions accordingly to a corresponding scheme for PMI reporting.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using TDM techniques, FDM techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communications device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, S2, etc.). Base stations 105 may communicate with one another over backhaul links 134 (e.g., X1, X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, IP connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 5 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 25 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, a base station 105 may have an antenna array with a number of rows and columns of antenna ports that the base station 105 may use for beamforming in its communication with a UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A radio link control (RLC) layer may in some cases perform packet segmentation and reassembly to communicate over logical channels. A medium access control (MAC) layer may perform priority handling and multiplexing of logical channels into transport channels. The MAC layer may also use hybrid automatic repeat request (HARM) to provide retransmission at the MAC layer to improve link efficiency. In the control plane, the radio resource control (RRC) protocol layer may provide establishment, configuration, and maintenance of an RRC connection between a UE 115 and a network device or core network 130 supporting radio bearers for user plane data. At the physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 kHz frequency range). A resource block may contain 12 consecutive subcarriers in the frequency domain and, for a normal cyclic prefix in each orthogonal frequency division multiplexing (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE 115 receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexed (FDD) and time division duplexed (TDD) component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD, or a combination of both.

A wireless communications system 100 may be classified into open-loop, semi-open-loop, and closed-loop schemes. Open-loop may refer to transmission performed by a transmitter without feedback of a receiver. Closed-loop may refer to a scheme by which the transmitter receives feedback from the receiver and accordingly performs transmission. In some cases, a wireless communications system (e.g., LTE, enhanced full-dimension MIMO (eFD-MIMO) and/or New Radio (NR) wireless communications system) may or may not support particular transmission schemes for unicast transmissions via physical downlink shared channel (PDSCH). A base station 105-a of wireless communications system 100 may adopt different techniques for such PDSCH transmissions. A first type of transmission scheme may include closed-loop transmission where data and reference signals may be transmitted with the same precoding matrix. In the first type of scheme, demodulation of data at UE 115-a may not require knowledge of the precoding matrix used at the transmitter. A second type of transmission scheme may include open-loop and semi-open-loop transmission, where data and demodulation reference signal (DMRS) may or may not be restricted to be transmitted with the same precoding matrix. In the second type of transmission scheme, demodulation of data at UE 115-a may or may not require knowledge of a relationship between reference signal ports and data layers. The second type of transmission schemes may include schemes including, for example, RBG level precoder cycling, SCDD, and a combination of RBG level cycling and SCDD.

According to the different transmission schemes, different techniques may be used for open-loop PMI reporting, including full PMI, partial PMI, and no PMI reporting. In some cases, precoding information fed back by a receiver may be indicated by a combination of two PMIs. A first PMI may have a long-term or wideband property, and may be referred to as W1, and the second PMI may have a short-term or partial-band property, and may be referred to as W2. For a full PMI reporting technique, both W1 and W2 may be reported, similarly as to a closed-loop technique. In a partial PMI reporting technique, W1 may be reported (i.e., i1), while precoder cycling may be performed over W2 (i.e., i2). In another case, a portion of W1 and a portion of W2 may be reported (e.g., a W11 or W12 part of W1), and precoder cycling may then be performed over (W12, W2) or (W11, W2). In this case, UE 115-a may assume some values, as the PMI would have been only partially reported. In the third technique, in which no PMI is reported, base station 105-a may indicate a subset of beams, for example, via a codebook subset restriction.

A method may provide for indicating whether CQI is based on a closed-loop, open-loop, or semi-open-loop transmission scheme, and for performing CQI computation using assumptions based a corresponding type of PMI reporting. That is, in some cases, a method for efficient CQI computation assumptions associated with PMI reporting for full PMI, partial PMI, and no PMI reporting techniques may be desirable. For example, for a full PMI reporting technique, SCDD may be applied based on selected W1 and W2. Alternatively, in partial PMI and no PMI reporting cases, CQI computation may be based on an assumption of the precoder usage of the non-reported part, for example, based on RBG level cycling, SCDD, or a combination of RBG level cycling and SCDD.

Wireless communications system 100 may support CSI feedback for semi-open-loop and open-loop schemes. For instance a UE 115 may determine an open-loop, semi-open-loop, or closed-loop transmission scheme for deriving CQI. In the case of determined open-loop transmission scheme, the UE 115 may select a transmission scheme corresponding to a time offset value and a precoder cycling granularity value. For example, the transmission scheme may be a SCDD scheme, a RBG-level precoder cycling scheme, or a combination thereof. The UE 115 may then, depending on its chosen transmission scheme, determine to use one or more of a time offset value, a precoder cycling granularity value, and a PMI matrix for CSI, and generate CQI accordingly. Additionally, the UE 115 may transmit the CQI to a base station 105 in a CSI report, and may include the determined values to indicate the transmission scheme used for the CQI derivation. Based on the CQI, the base station 105 may determine the transmission scheme and perform link adaption.

Figure 2:
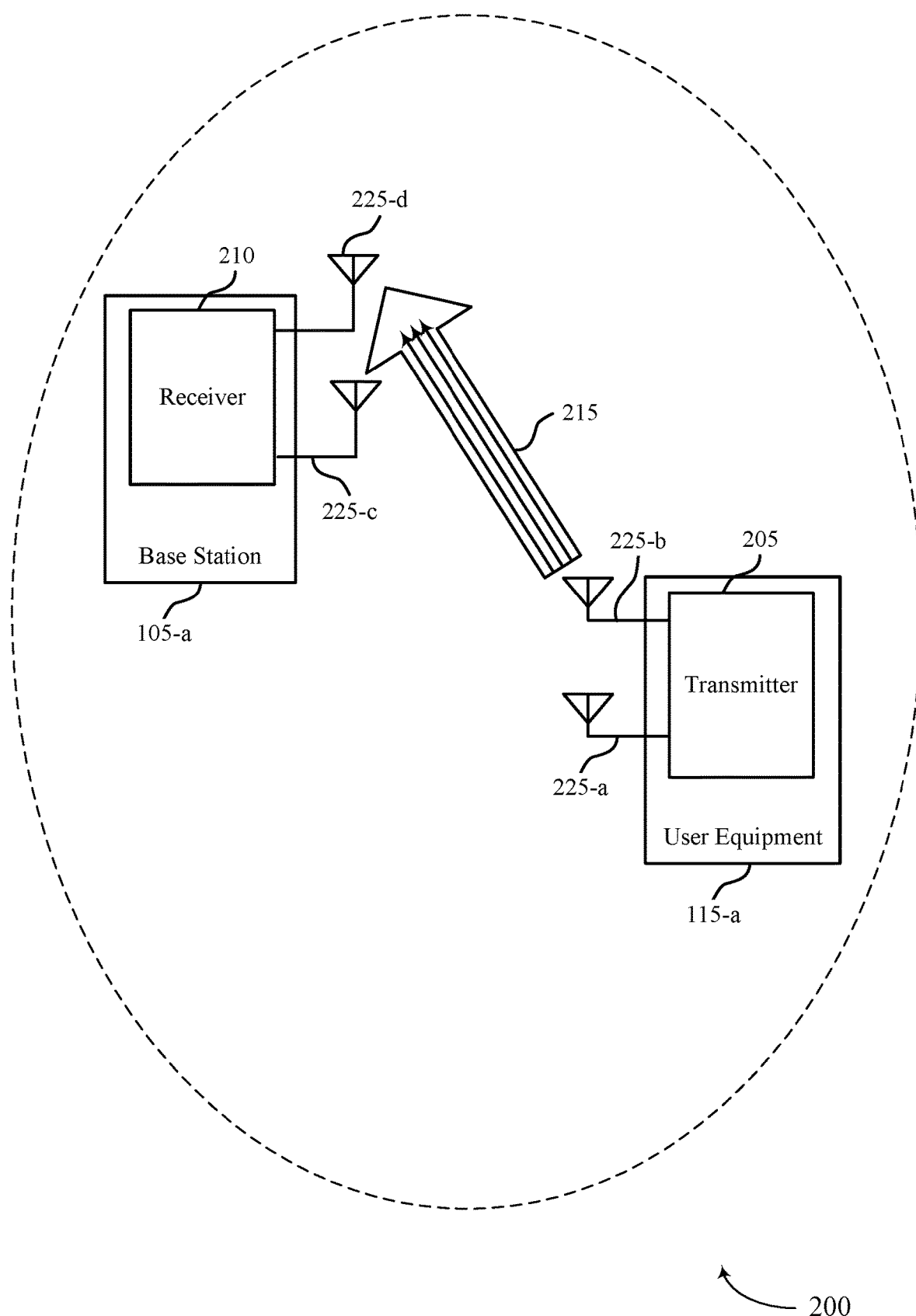
FIG. 2 illustrates an example of a wireless communications system in accordance with aspects of the present disclosure.

FIG. 2 illustrates an example of a wireless communications system 200 in accordance with aspects of the present disclosure. Wireless communications system 200 includes base station 105-a, which may be an example of a base station 105 as described with reference to FIG. 1. Wireless communications system also includes UE 115-a, which may be an example of a UE 115 as described with reference to FIG. 1. UE 115-a may be configured with a transmitter 205 used to transmit signals to base station 105-a, and base station 105-a may be configured with a receiver 210 used to receive signals from UE 115-a.

UE 115-a may select a transmission scheme based on a time offset between multiple antennas (e.g., virtual antennas). For example. UE 115-a may report parameters $\tau$ and M to indicate to base station 105-a a preferred transmission scheme (such as TS1 or TS2). $\tau$ may refer to a time offset between virtual antennas, as applied in a SCDD scheme, and M may represent a precoder cycling granularity value. The precoder cycling granularity value may correspond to a cycling granularity of precoders or a number of resource blocks (RBs) for which different precoders (e.g., precoding matrices) are the same. For instance, in RBG-level precoder cycling, two precoders may be used for a transmission, with one precoder used in, for example, odd-indexed RBs and another precoder used in even-indexed RBs. Accordingly, the precoder cycling granularity value may indicate a number of RBs for which a same precoder is used in precoder cycling over resources. In some cases, the antennas may include a first group of reference signal ports (e.g., CSI-reference signal (CSI-RS) ports) and a second group of CSI-RS ports. In some cases, a first value of $\tau$ may be applied to the first group of CSI-RS ports and a second value of $\tau$ may be applied to the second group of CSI-RS ports.

UE 115-a may select $\tau$ and M from corresponding sets of values configured by base station 105-a via, for example, RRC signaling, MAC control element (CE) signaling, or downlink control information (DCI). In some cases, $\tau$ and M may be predefined according to specification, or may be based on capabilities of UE 115-a. For example, UE 115-a may select $\tau \in \{0, 0.4\}$ μsec, or, alternatively, $\tau \in \{0, 0.2, 0.4, 0.8\}$ UE 115-a may select M from a set of defined values, where the set may be defined, for example, for one of two methods. In the first method, M={1, 2, 4, CSI feedback size} RBs (or, as may also be referred to as a non-cycling indicator). These candidate values for M may represent a number of RBs. Additionally or alternatively, granularity values may include multiples of RBs and a non-cycling indicator, where a maximum multiple of RBs may, for example, be less than or equal to the smallest frequency granularity for CSI feedback, and the non-cycling indicator may be equal to zero. In such cases, a set of precoder cycling granularity values (e.g., $\{0, 1, 2, 4\}$ (in units of RBs)) may be determined regardless of CSI feedback size. In some cases, if M is equal to a number of RBs in the CSI feedback resolution, then there may not be precoder cycling. For example, the cycling granularity values may include portions of the number of RBs for CSI feedback, where the non-cycling indicator is equal to one, indicating that the cycling granularity is the number of RBs for CSI feedback. In this case, the set of precoder cycling granularity values may be equal to $$\left\{\frac{1}{16}, \frac{1}{4}, \frac{1}{2}, 1\right\},$$

where the unit is the CSI feedback size. Accordingly, the cycling granularity may be equal to a selected portion times a configured CSI feedback size $$\left(\text{e.g., } M = \left\{\frac{1}{16}, \frac{1}{4}, \frac{1}{2}, 1\right\} * (CSI \text{ feedback size})\right).$$

In this case, the candidate values for M may be portions of the CSI feedback resolution, where 1 refers to the case of no precoder cycling.

Additionally or alternatively, determining the time offset and precoder cycling granularity values may be based on other configurations or measurements. For example, the time offset and precoder cycling granularity values may be based on a precoder granularity of a data channel, and/or measurements including UE mobility (e.g., a UE mobility parameter) or a delay spread.

Based on respective values of $\tau$ and M, UE 115-$a$ may generate and correspondingly indicate CQI using a selected transmission scheme. For example, if $\tau$=0, and M is equal to a non-cycling indicator (CSI feedback size), the UE 115-$a$ may use a closed-loop transmission scheme. If $\tau$>0, and M is equal to the CSI feedback size, the UE 115-$a$ may use a SCDD scheme. If $\tau$=0, and M is less (or, generally unequal to) than the CSI feedback size, the UE 115-$a$ may use a RBG level precoder cycling scheme. If $\tau$>0, and M is less than (or, generally unequal to) the CSI feedback size, the UE 115-$a$ may use a scheme including a combination of SCDD and RBG level precoder cycling.

Further based on the respective values of $\tau$ and M, UE 115-$a$ may perform CQI computation based on whether the PMI reporting technique is a full PMI reporting technique, a partial PMI reporting technique, or a non PMI reporting technique. For full PMI reporting, CQI may be derived based on the PMI matrix W1. A PMI matrix W2 may be reported with a value for $\tau$, and where M may be equal to the CSI feedback size. For partial PMI, CQI may be derived from W1, or the portions or component matrices of W1, (e.g., W11 or W12), with a reported value for $\tau$ and for M. For no PMI reporting, the CQI may be derived based on codebook subset restriction, with a reported value for $\tau$ and for M. In some cases, a codebook subset restriction may be applied in any of the cases of full PMI reporting, partial PMI reporting, and no PMI reporting. In such cases, CQI may be derived based on the codebook subset restriction (e.g., when configured). In some cases, such as for partial PMI reporting and no PMI reporting cases, there may be a varied cycling order of unreported PMIs. For example, if W1 is reported, and there are 16 vectors for W2 to cycle, the cycling order may be [0, 1, 2, 3 . . . 15], or, for example: [0, 4, 8, 12, 1, 5, 9, 13, 2, 6, 10, 14, 3, 7, 11, 15].

Joint coding may further be used for coding $\tau$ and M in the CSI reporting. In a first technique for coding of $\tau$ and M in the CSI reporting, $\tau$ and M may be jointly coded with a rank indicator (RI). In this case, if there may be A bits for $\tau$, B bits for M, and C bits for the RI, then corresponding A+B+C bits may be inputted to the channel encoder. In some cases, the first technique may be performed similarly, but without jointly coding $\tau$ and M with PMI or CQI. Additionally or alternatively, in a second technique, $\tau$ and M may be jointly coded without a RI. In this case, values for the payload sizes for $\tau$, M, and the RI may be fixed. In some cases, the values for each of these parameters may impact the payload sizes of the PMI and CQI.

A first example is provided for the case of full PMI reporting. In an example of the case of full PMI reporting, UE 115-$a$ may use a particular precoder for CQI computation, where D represents an SCDD matrix which gradually changes in subcarrier level. The phase change may be a function of the time offset, the time offset given by:

$$\tau, \Delta\theta = 2\pi \times \tau \times f_{scs}, \quad (1)$$

to produce:

$$x(k) = D(k) \times W_1 \times W_2 \times s_k, \quad (2)$$

where $$D(k) = \begin{bmatrix} 1 & 0 \\ 0 & \exp(jk\Delta\theta) \end{bmatrix}. \quad (3)$$

Here, $W_1$ is beam matrix (i.e., PMI matrix), given by:

$$W_1 = \begin{bmatrix} b_0 & b_1 b_2 & b_3 & 0 & 0 & 0 & 0 \\ 0 & 0 & 0 & 0 & b_0 & b_1 b_2 & b_3 \end{bmatrix}. \quad (4)$$

Here, $W_2$ is beam selection and co-phase matrix, as may be determined through selection by UE 115-$a$, given by:

$$W_2 = e_i \otimes \begin{bmatrix} 1 \\ \exp(jk\theta_{ini}) \end{bmatrix}. \quad (5)$$

Here, $\theta_{ini}$ may be considered an initial phase of the SCDD for the given sub-band. The value of $\theta_{ini}$ may be given by $$0, \frac{\pi}{2}, \pi, \text{ and } \frac{3\pi}{2}.$$

In some cases (e.g., type II codebook), $W_2$ may be given by:

$$W_2 = [p_{r,i} \exp(jk\theta_{r,i})]^T, \quad (6)$$

containing amplitude term $p_{r,i}$ for a beam i and a polarization r, and a phase term $\theta_{r,i}$ for a beam i and polarization r. In some cases, the value of $\theta_{r,i}$ may be based on phase modulation (e.g., 8PSK) symbols.

A second example is provided for the case of partial PMI reporting or no PMI reporting. In an example of the case of partial PMI reporting or no PMI reporting, UE 115-$a$ may use a particular precoder for CQI computation, where D represents an SCDD matrix. The phase change across tones may be a function of the time offset, the time offset given by:

$$\tau, \Delta\theta = 2\pi \times \tau \times f_{scs}, \quad (7)$$

to produce:

$$x(k) = D(k) \times W_1 \times W_2(n, i) \times s_k, \quad (8)$$

-continued where $$D(k) = \begin{bmatrix} 1 & 0 \\ 0 & \exp(jk\Delta\theta) \end{bmatrix}. \quad (9)$$

Here, $W_1$ may be based on a wideband PMI report, and may be given by:

$$W_1 = \begin{bmatrix} b_0 & b_1b_2 & b_3 & 0 & 0 & 0 & 0 \\ 0 & 0 & 0 & 0 & b_0 & b_1b_2 & b_3 \end{bmatrix}. \quad (10)$$

Here, $W_2$ (n, i) may change, for example, every M RBs. In this example, only $W_2$, given by:

$$W_2 = e_i \otimes \begin{bmatrix} 1 \\ \exp(jk\theta_{ini}) \end{bmatrix}, \quad (11)$$

may cycle, where $$\theta_n = \frac{\pi(n-1)}{2}, n = 1,2,3,4,$$

and i=1, 2, 3, 4. An example is provided here for M=1. Linking k with:

$$(n, i): i = \left\lfloor \mod\left(\left\lfloor \frac{k}{12M} \right\rfloor, 16\right)/4 \right\rfloor + 1, \quad (12)$$

and $$n = \mod\left(\mod\left(\left\lfloor \frac{k}{12M} \right\rfloor, 16\right), 4\right) + 1, \quad (13)$$

may produce the resulting precoding:

| RB     | 0 | 1 | 2 | 3 | 4 | 5 | 6 | 7 | ... |
|--------|---|---|---|---|---|---|---|---|-----|
| i of $e_i$ | 1 | 1 | 1 | 1 | 2 | 2 | 2 | 2 | ... |
| n      | 1 | 2 | 3 | 4 | 1 | 2 | 3 | 4 | ... |

Additionally or alternatively, a precoder cycling may further be based on codebook subset restriction.

Figure 3:
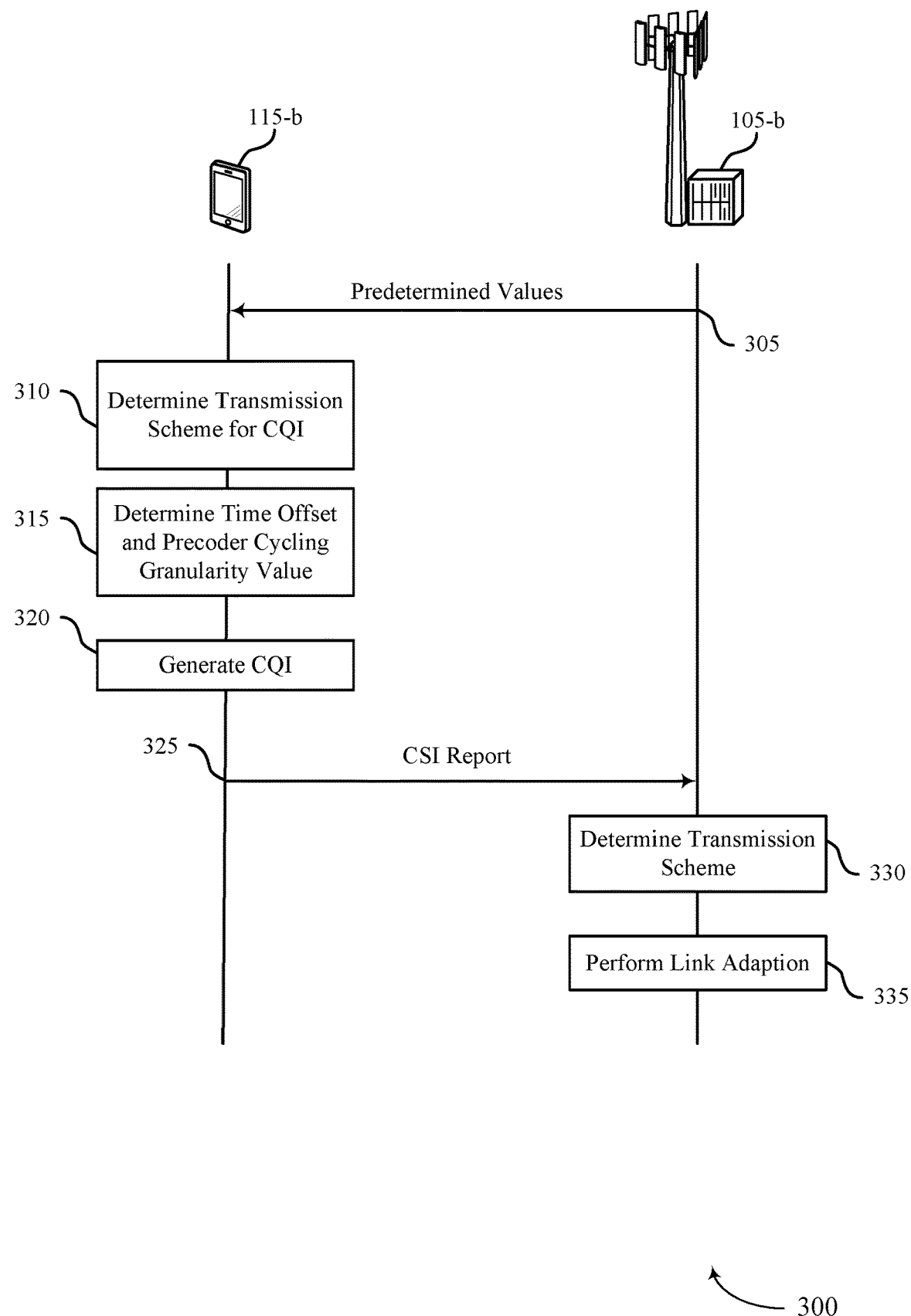
FIG. 3 illustrates an example of a process flow in accordance with aspects of the present disclosure.

FIG. 3 illustrates an example of a process flow 300 in accordance with aspects of the present disclosure. In some examples, process flow 300 may implement aspects of wireless communications system 100. For example, process flow includes a UE 115-*b* and base station 105-*b*, which may be examples of the corresponding devices described with reference to FIGS. 1 through 4.

At 305, base station 105-*b* may transmit to UE 115-*b*, and UE 115-*b* may receive from base station 105-*b*, predetermined values. In some cases, the predetermined set of precoder cycling granularity values may include a multiple of a number of RBs for CSI feedback, or a portion of the number of RBs for CSI feedback. Additionally or alternatively, the predetermined set of precoder cycling granularity values may include multiples of a number of RBs and a non-cycling indicator (i.e., a CSI feedback size), if, for example, a maximum multiple of the number of RBs is less than or equal to a smallest frequency granularity for CSI feedback, and the non-cycling indicator is equal to zero. The predetermined set of time offset values and the predetermined set of precoder cycling granularity values may be transmitted and received via any of a MAC CE, an RRC message, and DCI.

At 310, UE 115-*b* may determine a transmission scheme for CQI. In some cases, transmission scheme may include a first transmission scheme or a second transmission scheme. In some cases, the first transmission scheme may be a closed-loop transmission scheme and the second transmission scheme may be a semi-open-loop transmission scheme or an open-loop transmission scheme. In some cases, the second transmission scheme may be determined to be a SCDD scheme, a RBG level precoder cycling scheme, or a combination of both.

At 315, UE 115-*b* may determine a time offset and a precoder cycling granularity values based on the transmission scheme determined at 310. The time offset value may be selected from a predetermined set of time offset values, as may have been received from base station 105-*b* at 305. The precoder cycling granularity value may be selected from a predetermined set of precoder cycling granularity values, as may have been received from base station 105-*b* at 305.

In some cases, based on the first transmission scheme determined at 310, UE 115-*b* may determine that the time offset value is, for example, equal to zero and the precoder cycling granularity value is equal to a non-cycling indicator. In some cases, based on the second transmission scheme being determined at 310 to be a SCDD scheme, UE 115-*b* may determine that the time offset value is, for example, greater than zero and the precoder cycling granularity value is equal to a non-cycling indicator. In some cases, based on the second transmission scheme being determined at 310 to be a RBG level precoder cycling scheme, UE 115-*b* may determine that the time offset value is, for example, equal to zero and the precoder cycling granularity value is not equal to a non-cycling indicator. In some cases, based on the second transmission scheme being determined at 310 to be a combination of a SCDD scheme and a RBG level precoder cycling scheme, UE 115-*b* may determine that the time offset value is, for example, greater than zero and the precoder cycling granularity value is not equal to a non-cycling indicator.

At 320, UE 115-*b* may generate CQI based on the transmission scheme determined at 310. Generating CQI may include determining a PMI reporting scheme, where the PMI reporting scheme includes at least one full PMI reporting, partial PMI reporting, and no PMI reporting. In some cases, determining the PMI reporting scheme may be based on a quantity associated with the CSI report. In some cases, generating the CQI may include applying a first precoder for RBG and a second precoder for a second RBG, where a size of the first RBG and a size of the second RBG are equal to the determined precoder cycling granularity value.

CQI may then be derived based on the determined PMI reporting scheme. If the PMI reporting scheme includes full PMI reporting, the CQI may be derived based on, for example, a first PMI matrix, a second PMI matrix, the determined time offset value, and the precoder cycling granularity value being equal to a non-cycling indicator. If the PMI reporting scheme includes partial PMI reporting, the CQI may be derived based on, for example, a first PMI matrix or a component of the first PMI matrix and the determined time offset value and the precoder cycling granularity value. If the PMI reporting scheme includes no PMI reporting, the CQI may be derived based on, for example, the determined time offset value and the precoder cycling granularity value. In some cases, UE 115-*b* may further determine that a codebook subset restriction (CSR) is configured, and derive the CQI based on the CSR.

At 325, UE 115-*b* may transmit to base station 105-*b*, and base station 105-*b* may receive from UE 115-*b*, a CSI report with CQI. The CSI report may include a PMI, the time offset value, and the precoder cycling granularity value, as UE 115-*b* may have determined, for example, at 315. In some cases, the time offset value and/or the precoder cycling granularity value may be jointly coded within the CSI report. In some cases, the time offset value and/or the precoder cycling granularity value may further be jointly coded with a RI within the CSI report.

At 330, base station 105-*b* may determine a transmission schedule. The transmission schedule may include a first transmission scheme and a second transmission scheme. The transmission schedule may be used by UE 115-*b* to generate further CQI, for example, based on the received time offset value and the precoder cycling granularity value. Base station 105-*b* may identify the first transmission scheduled and second transmission schedule to be, for example, the values as would be determined by a UE 115 according to step 315, corresponding to a SCDD scheme, a RBG level precoder cycling scheme, or a combination thereof.

At 335, base station 105-*b* may perform link adaption. The link adaption may be based on the transmission scheme determined at 330 and the CSI report received at 325.

Figure 4:
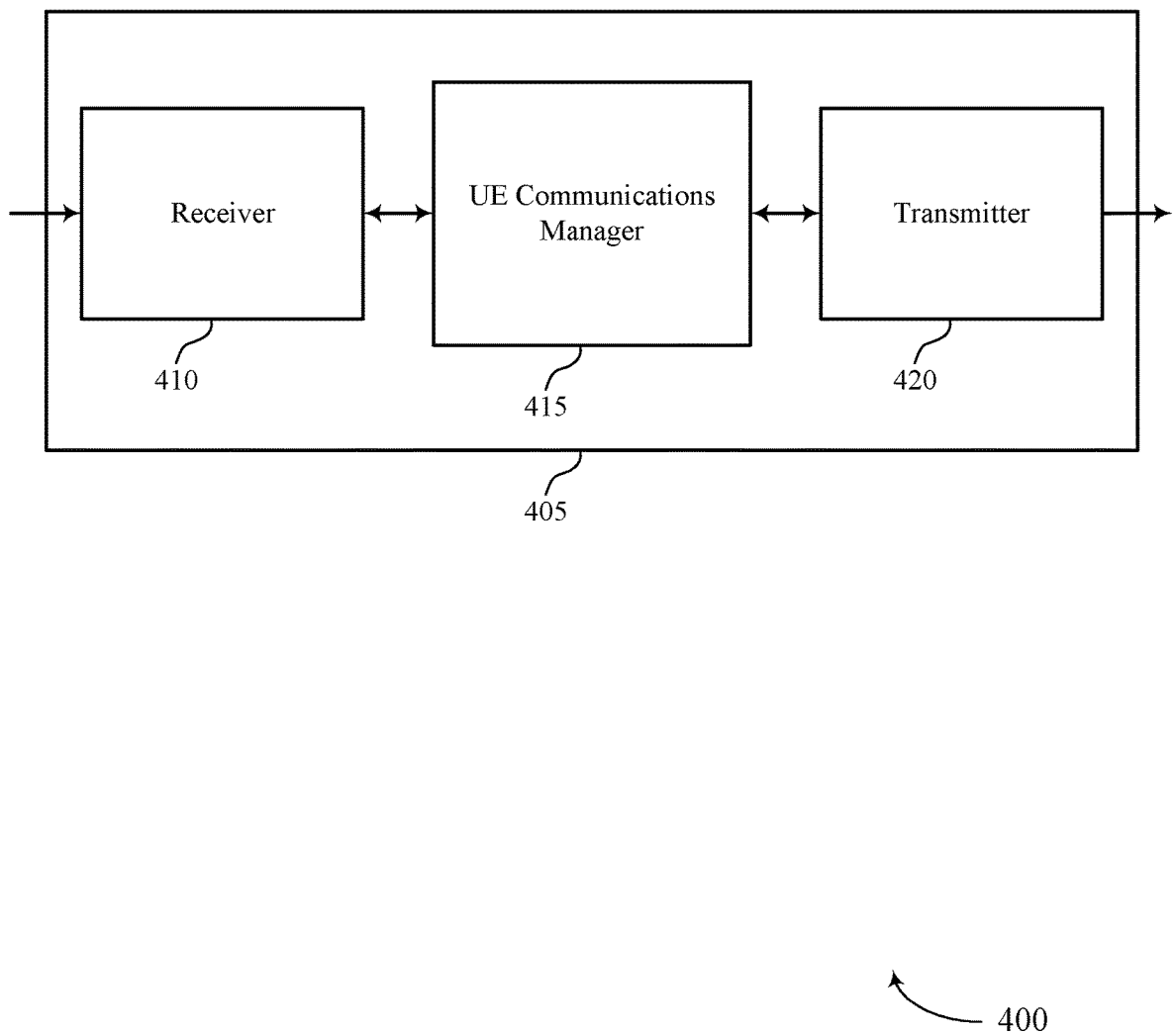
FIGS. 4 and 5 show block diagrams of wireless devices in accordance with aspects of the present disclosure.

FIG. 4 shows a block diagram 400 of a wireless device 405 in accordance with aspects of the present disclosure. Wireless device 405 may be an example of aspects of a UE 115 as described herein. Wireless device 405 may include receiver 410, UE communications manager 415, and transmitter 420. Wireless device 405 may also include a processor. Each of these components may be in communication with one another (e.g., via one or more buses).

Receiver 410 may receive information such as packets, user data, or control information associated with various information channels (e.g., control channels, data channels, and information related to CSI feedback for semi-open-loop and open-loop schemes, etc.). Information may be passed on to other components of the device. The receiver 410 may be an example of aspects of the transceiver 735 as described with reference to FIG. 7. The receiver 410 may utilize a single antenna or a set of antennas.

UE communications manager 415 may be an example of aspects of the UE communications manager 715 as described with reference to FIG. 7. UE communications manager 415 and/or at least some of its various sub-components may be implemented in hardware, software executed by a processor, firmware, or any combination thereof. If implemented in software executed by a processor, the functions of the UE communications manager 415 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 415 and/or at least some of its various sub-components may be physically located at various positions, including being distributed such that portions of functions are implemented at different physical locations by one or more physical devices. In some examples, UE communications manager 415 and/or at least some of its various sub-components may be a separate and distinct component in accordance with aspects of the present disclosure. In other examples, UE communications manager 415 and/or at least some of its various sub-components may be combined with one or more other hardware components, including but not limited to an I/O component, a transceiver, a network server, another computing device, one or more other components described in the present disclosure, or a combination thereof in accordance with aspects of the present disclosure.

UE communications manager 415 may determine at least one of a time offset value between two or more antenna ports or a precoder cycling granularity value associated with the determined transmission scheme, generate the CQI based on at least one of the determined time offset value and the precoder cycling granularity value, and transmit, in a CSI report, the generated CQI. In some cases, UE communications manager 415 may transmit, in the CSI report, at least one of the time offset value or the precoder cycling granularity value with the generated CQI. In some cases, UE communications manager 415 may determine the transmission scheme for CQI, where the transmission scheme for CQI may include a first transmission scheme or a second transmission scheme.

Transmitter 420 may transmit signals generated by other components of the device. In some examples, the transmitter 420 may be collocated with a receiver 410 in a transceiver module. For example, the transmitter 420 may be an example of aspects of the transceiver 735 as described with reference to FIG. 7. The transmitter 420 may utilize a single antenna or a set of antennas.

Figure 5:
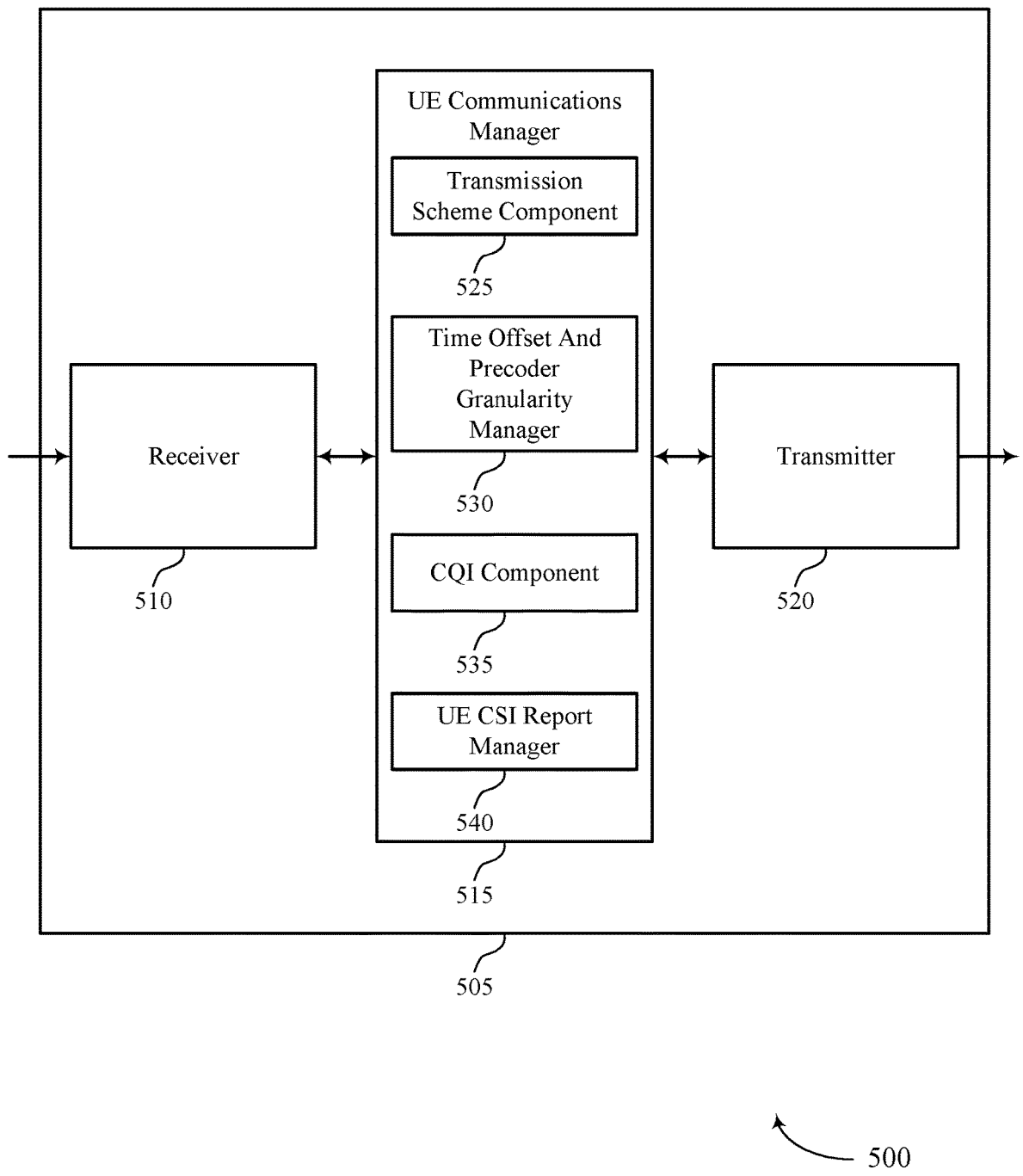

FIG. 5 shows a block diagram 500 of a wireless device 505 in accordance with aspects of the present disclosure. Wireless device 505 may be an example of aspects of a wireless device 405 or a UE 115 as described with reference to FIG. 4. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to CSI feedback for semi-open-loop and open-loop schemes, etc.). Information may be passed on to other components of the device. The receiver 510 may be an example of aspects of the transceiver 735 as described with reference to FIG. 7. The receiver 510 may utilize a single antenna or a set of antennas.

UE communications manager 515 may be an example of aspects of the UE communications manager 715 as described with reference to FIG. 7. UE communications manager 515 may also include transmission scheme component 525, time offset and precoder granularity manager 530, CQI component 535, and UE CSI report manager 540.

Transmission scheme component 525 may determine a transmission scheme for CQI, where the transmission scheme may include a first transmission scheme or a second transmission scheme. In some cases, the first transmission scheme may be a closed-loop transmission scheme (e.g., TS1) and the second transmission scheme may be a semi-open-loop transmission scheme or an open-loop transmission scheme (e.g., TS2).

Time offset and precoder granularity manager 530 may determine at least one of a time offset value or a precoder cycling granularity value, select the time offset value from a predetermined set of time offset values, and select the precoder cycling granularity value from a predetermined set of precoder cycling granularity values. In some examples, the predetermined set of precoder cycling granularity values may include a portion of a number of RBs for CSI feedback and a non-cycling indicator, where the non-cycling indicator is equal to one. In some cases, determining the time offset value and the precoder cycling granularity value may include determining that the time offset value is equal to zero and the precoder cycling granularity value is equal to a non-cycling indicator, where the determined transmission scheme is the first transmission scheme. In some cases, determining at least one of the time offset value or the precoder cycling granularity value may include determining that the time offset value is greater than zero and the precoder cycling granularity value is equal to a non-cycling indicator, where the determined transmission scheme is the second transmission scheme.

Additionally or alternatively, determining at least one of the time offset value or the precoder cycling granularity value may include determining that the time offset value is equal to zero and the precoder cycling granularity value is not equal to a non-cycling indicator, where the determined transmission scheme is the second transmission scheme. In some examples, determining at least one of the time offset value or the precoder cycling granularity value includes determining that the time offset value is greater than zero and the precoder cycling granularity value is not equal to a non-cycling indicator, where the determined transmission scheme is the second transmission scheme.

CQI component 535 may generate the CQI based on at least one of the determined time offset value or the determined precoder cycling granularity value. In some cases, generating the CQI includes determining a PMI reporting scheme, where the PMI reporting scheme may include full PMI reporting, partial PMI reporting, or no PMI reporting. In some examples, CQI component 535 may derive the CQI based on the determined PMI reporting scheme, or may derive the CQI based on a RI, a first PMI matrix, a second PMI matrix, the determined time offset value, and the determined precoder cycling granularity value being equal to a non-cycling indicator, where the PMI reporting scheme includes full PMI reporting. In other examples, CQI component 535 may derive the CQI based on a CSR. In other examples, CQI component 535 may derive the CQI based on a RI, a first PMI matrix or a component of the first PMI matrix, the determined time offset value, and the determined precoder cycling granularity value, where the PMI reporting scheme includes partial PMI reporting. Additionally or alternatively, CQI component 535 may derive the CQI based on a RI, the determined time offset value, and the precoder cycling granularity value, where the PMI reporting scheme includes no PMI reporting. In some cases, generating the CQI may include applying a first precoder for RBG and a second precoder for a second RBG, where a size of the first RBG and a size of the second RBG are equal to the determined precoder cycling granularity value. UE CSI report manager 540 may transmit, in a CSI report, the generated CQI. In some cases, UE CSI report manager 540 may transmit, in the CSI report, at least one of the time offset value or the precoder cycling granularity value with the generated CQI.

Transmitter 520 may transmit signals generated by other components of the device. In some examples, the transmitter 520 may be collocated with a receiver 510 in a transceiver module. For example, the transmitter 520 may be an example of aspects of the transceiver 735 as described with reference to FIG. 7. The transmitter 520 may utilize a single antenna or a set of antennas.

Figure 6:
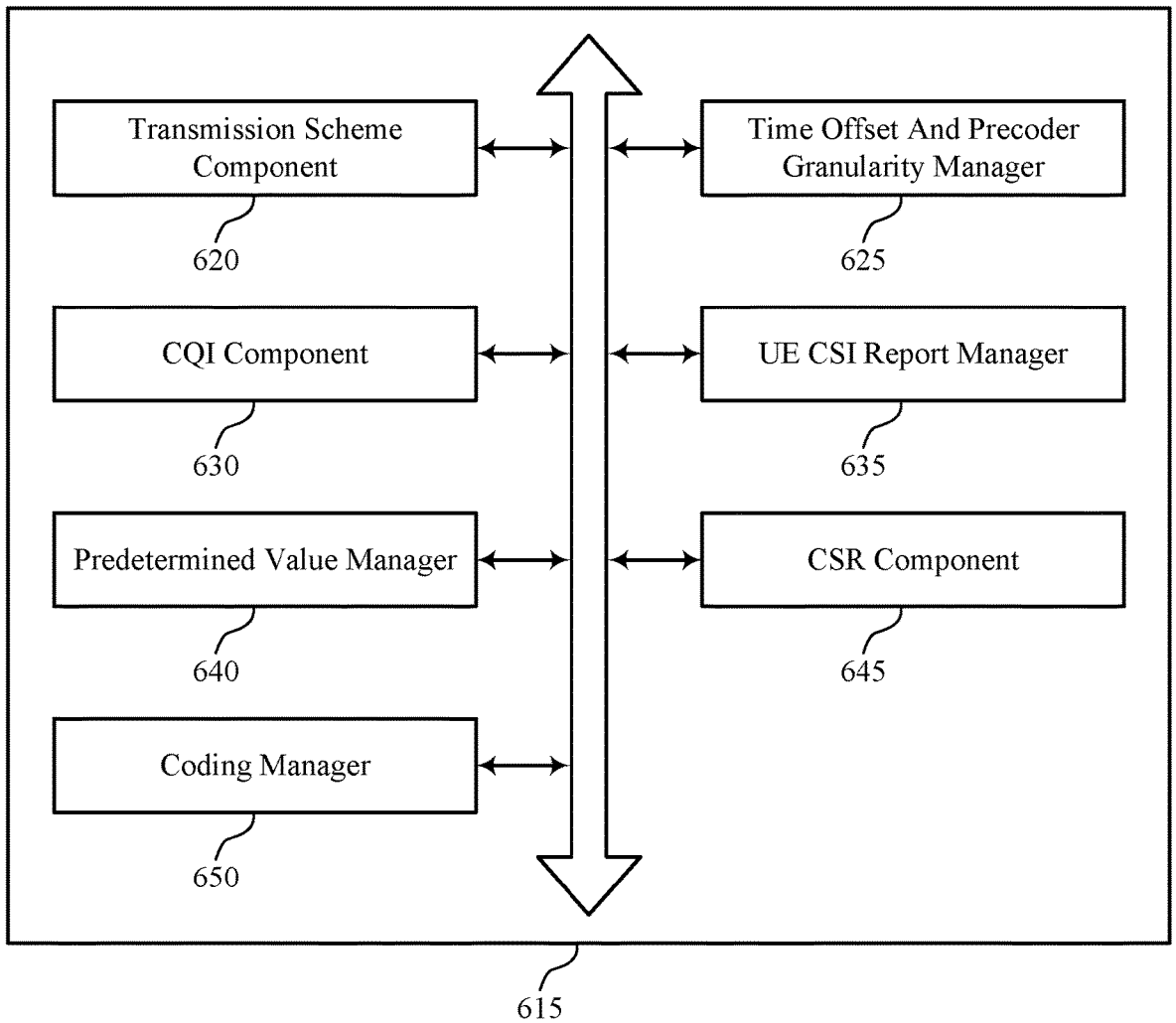
FIG. 6 shows a block diagram of a user equipment (UE) communications manager in accordance with aspects of the present disclosure.

FIG. 6 shows a block diagram 600 of a UE communications manager 615 in accordance with aspects of the present disclosure. The UE communications manager 615 may be an example of aspects of a UE communications manager 415, a UE communications manager 515, or a UE communications manager 715 described with reference to FIGS. 4, 5, and 7. The UE communications manager 615 may include transmission scheme component 620, time offset and precoder granularity manager 625, CQI component 630, UE CSI report manager 635, predetermined value manager 640, CSR component 645, and coding manager 650. Each of these modules may communicate, directly or indirectly, with one another (e.g., via one or more buses).

Transmission scheme component 620 may determine the transmission scheme for CQI, where the transmission scheme for CQI may include a first transmission scheme or a second transmission scheme. In some cases, the first transmission scheme includes a closed-loop transmission scheme and the second transmission scheme includes a semi-open-loop transmission scheme or an open-loop transmission scheme.

Time offset and precoder granularity manager 625 may determine at least one of a time offset value between two or more antenna ports or a precoder cycling granularity value associated with a transmission scheme for CQI. In some cases, the two or more antenna ports include a first group of CSI-RS ports and a second group of CSI-RS ports. In some cases, the time offset value and/or the precoder cycling granularity value may be determined based on a precoder granularity associated with a data channel, a UE mobility parameter, a delay spread, or a combination thereof. In some cases, the time offset value and/or the precoder cycling granularity value are configured via a MAC CE, an RRC message, or DCI. Time offset and precoder granularity manager 625 may select the time offset value from a predetermined set of time offset values and select the precoder cycling granularity value from a predetermined set of precoder cycling granularity values. In some examples, the predetermined set of precoder cycling granularity values includes a portion of a number of RBs for CSI feedback and a non-cycling indicator, and the non-cycling indicator is equal to one. In some cases, determining at least one of the time offset value or the precoder cycling granularity value includes determining that the time offset value is equal to zero and the precoder cycling granularity value is equal to a non-cycling indicator, where the determined transmission scheme is the first transmission scheme. In some cases, determining at least one of the time offset value or the precoder cycling granularity value may include determining that the time offset value is greater than zero and the precoder cycling granularity value is equal to a non-cycling indicator, where the determined transmission scheme is the second transmission scheme.

Additionally or alternatively, determining at least one of the time offset value or the precoder cycling granularity value may include determining that the time offset value is equal to zero and the precoder cycling granularity value is not equal to a non-cycling indicator, where the determined transmission scheme is the second transmission scheme including RBG level precoder cycling. In some examples, determining at least one of the time offset value or the precoder cycling granularity value includes determining that the time offset value is greater than zero and the precoder cycling granularity value is not equal to a non-cycling indicator, where the determined transmission scheme is the second transmission scheme including SCDD and RBG level precoder cycling.

CQI component 630 may generate the CQI based on at least one of the determined time offset value and the determined precoder cycling granularity value. In some cases, generating the CQI may include applying the time offset value to the second group of CSI-RS ports relative to the first group of CSI-RS ports. In some cases, generating the CQI includes determining a PMI reporting scheme based on a quantity associated with the CSI report, where the PMI reporting scheme may include full PMI reporting, partial PMI reporting, or no PMI reporting. In some examples, CQI component 630 may derive the CQI based on the determined PMI reporting scheme, or may derive the CQI based on a RI, a first PMI matrix, a second PMI matrix, the determined time offset value, and the determined precoder cycling granularity value being equal to a non-cycling indicator, where the PMI reporting scheme includes full PMI reporting. In other examples, CQI component 630 may derive the CQI based on a CSR. In other examples, CQI component 630 may derive the CQI based on a RI, a first PMI matrix or a component of the first PMI matrix, the determined time offset value, and the determined precoder cycling granularity value, where the PMI reporting scheme includes partial PMI reporting. Additionally or alternatively, CQI component 630 may derive the CQI based on a RI, the determined time offset value, and the precoder cycling granularity value, where the PMI reporting scheme includes no PMI reporting. In some cases, generating the CQI may include applying a first precoder for RBG and a second precoder for a second RBG, where a size of the first RBG and a size of the second RBG are equal to the determined precoder cycling granularity value.

UE CSI report manager 635 may transmit, in a CSI report, the generated CQI. In some cases, UE CSI report manager 635 may transmit, in the CSI report, at least one of the time offset value or the precoder cycling granularity value with the generated CQI. Predetermined value manager 640 may receive a predetermined set of time offset values and a predetermined set of precoder cycling granularity values via a MAC CE, or an RRC message, or DCI. In some cases, determining at least one of the time offset value or the precoder cycling granularity value includes selecting the time offset value from the predetermined set of time offset values and selecting the precoder cycling granularity value from the predetermined set of precoder cycling granularity values. In some cases, the predetermined set of time offset values and the predetermined set of precoder cycling granularity values may be determined based on a capability associated with the UE. In some cases, the predetermined set of precoder cycling granularity values includes multiples of a RBs and a non-cycling indicator, and a maximum multiple of the number of RBs is less than or equal to a smallest frequency granularity for CSI feedback and the non-cycling indicator is equal to zero. In some examples, the predetermined set of precoder cycling granularity values includes a portion of a number of RBs for CSI feedback and a non-cycling indicator, and where the non-cycling indicator is equal to one. In some cases, the predetermined set of precoder cycling granularity values include a multiple of a number of RBs for CSI feedback or a portion of the number of RBs for CSI feedback.

CSR component 645 may determine that the CSR is configured. Coding manager 650 may jointly code the time offset value or the precoder cycling granularity value with an RI within the CSI report. In some cases, CSR component 645 jointly code the time offset value or the precoder cycling granularity value within the CSI report.

Figure 7:
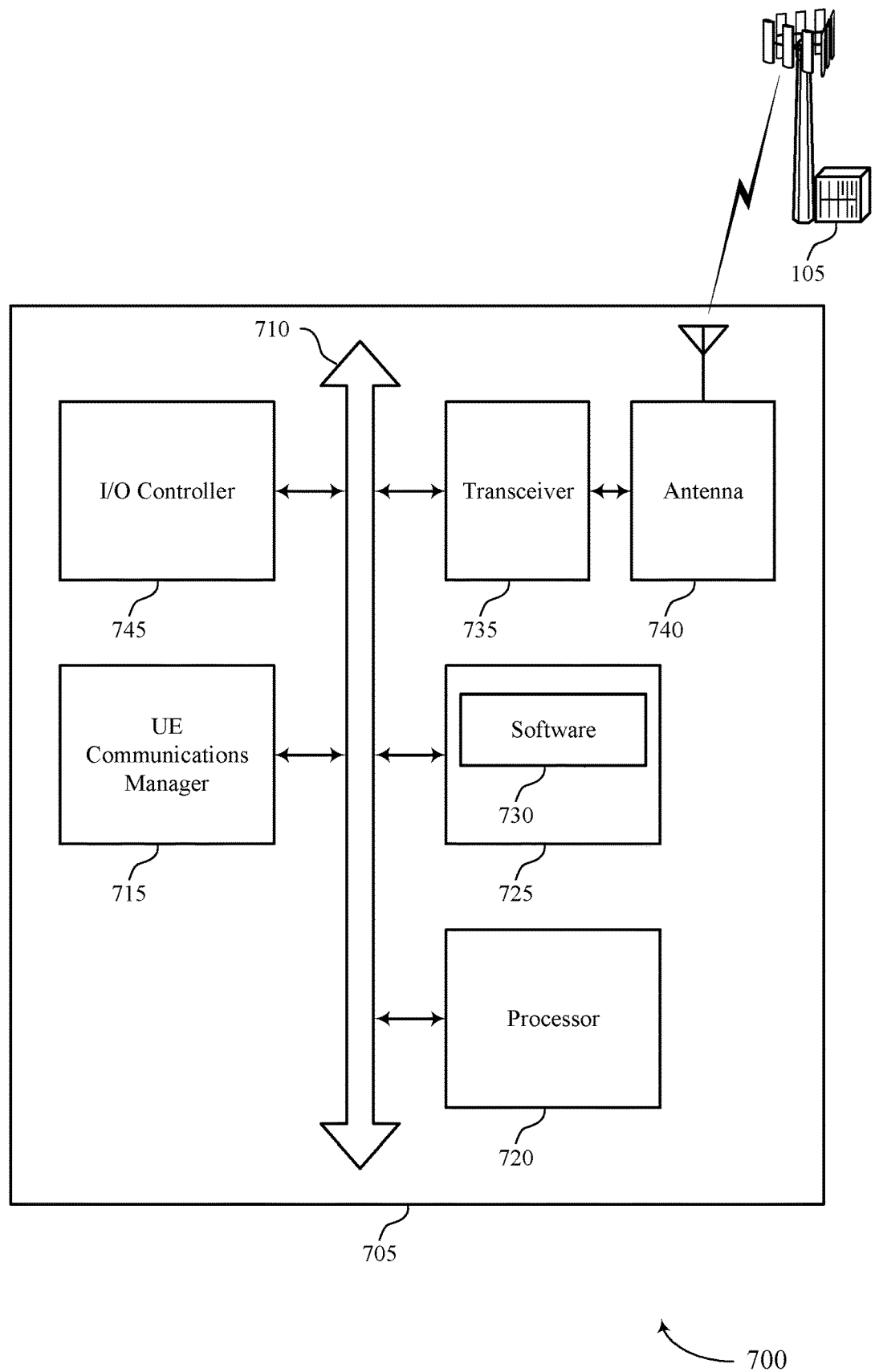
FIG. 7 illustrates a block diagram of a system including a device in accordance with aspects of the present disclosure.

FIG. 7 shows a diagram of a system 700 including a device 705 in accordance with aspects of the present disclosure. Device 705 may be an example of or include the components of wireless device 405, wireless device 505, or a UE 115 as described above, e.g., with reference to FIGS. 4 and 5. Device 705 may include components for bi-directional voice and data communications including components for transmitting and receiving communications, including UE communications manager 715, processor 720, memory 725, software 730, transceiver 735, antenna 740, and I/O controller 745. These components may be in electronic communication via one or more buses (e.g., bus 710). Device 705 may communicate wirelessly with one or more base stations 105.

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting CSI feedback for semi-open-loop and open-loop schemes).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware or software operation such as the interaction with peripheral components or devices.

Software 730 may include code to implement aspects of the present disclosure, including code to support CSI feedback for semi-open-loop and open-loop schemes. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas. In some cases, the wireless device may include a single antenna 740. However, in some cases the device may have more than one antenna 740, which may be capable of concurrently transmitting or receiving multiple wireless transmissions.

I/O controller 745 may manage input and output signals for device 705. I/O controller 745 may also manage peripherals not integrated into device 705. In some cases, I/O controller 745 may represent a physical connection or port to an external peripheral. In some cases, I/O controller 745 may utilize an operating system such as iOS®, ANDROID®, MS-DOS®, MS-WINDOWS®, OS/2®, UNIX®, LINUX®, or another known operating system. In other cases, I/O controller 745 may represent or interact with a modem, a keyboard, a mouse, a touchscreen, or a similar device. In some cases, I/O controller 745 may be implemented as part of a processor. In some cases, a user may interact with device 705 via I/O controller 745 or via hardware components controlled by I/O controller 745.

Figure 8:
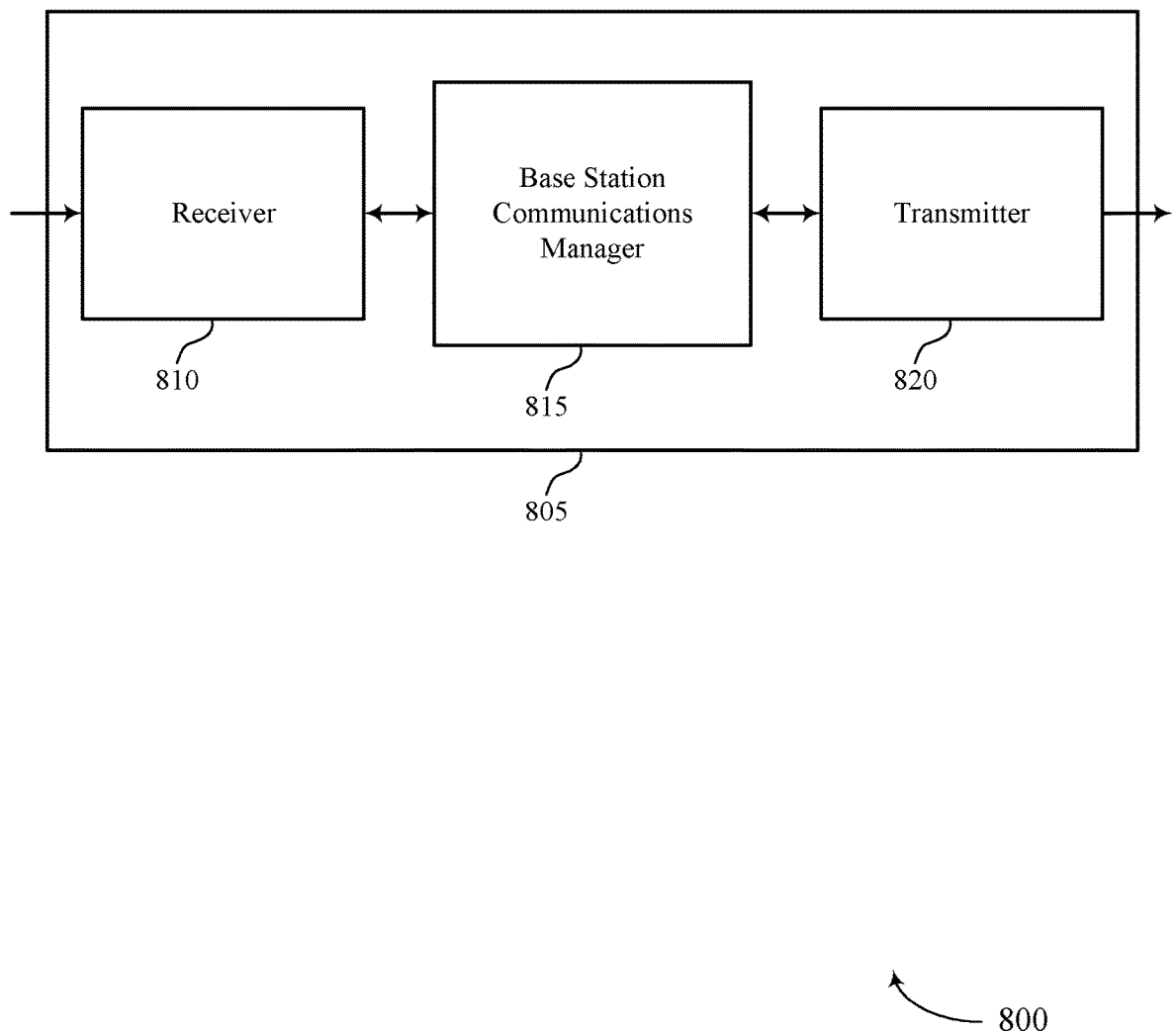
FIGS. 8 and 9 show block diagrams of wireless devices in accordance with aspects of the present disclosure.

FIG. 8 shows a block diagram 800 of a wireless device 805 in accordance with aspects of the present disclosure. Wireless device 805 may be an example of aspects of a base station 105 as described herein. Wireless device 805 may include receiver 810, base station communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to CSI feedback for semi-open-loop and open-loop schemes, etc.). Information may be passed on to other components of the device. The receiver 810 may be an example of aspects of the transceiver 1135 as described with reference to FIG. 11. The receiver 810 may utilize a single antenna or a set of antennas.

Base station communications manager 815 may be an example of aspects of the base station communications manager 1115 as described with reference to FIG. 11. Base station communications manager 815 and/or at least some of its various sub-components may be implemented in hardware, software executed by a processor, firmware, or any combination thereof. If implemented in software executed by a processor, the functions of the base station communications manager 815 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 815 and/or at least some of its various sub-components may be physically located at various positions, including being distributed such that portions of functions are implemented at different physical locations by one or more physical devices. In some examples, base station communications manager 815 and/or at least some of its various sub-components may be a separate and distinct component in accordance with aspects of the present disclosure. In other examples, base station communications manager 815 and/or at least some of its various sub-components may be combined with one or more other hardware components, including but not limited to an I/O component, a transceiver, a network server, another computing device, one or more other components described in the present disclosure, or a combination thereof in accordance with aspects of the present disclosure.

Base station communications manager 815 may receive CQI in a CSI report, the CQI based at least one of on a time offset value between two or more antenna ports and a precoder cycling granularity value. Base station communications manager 815 may determine a transmission scheme used for generating the CQI based on at least one of the received time offset value or the precoder cycling granularity value, and perform link adaptation based on the determined transmission scheme and the CSI report. In some cases, the transmission scheme may include a first transmission scheme or a second transmission scheme.

Transmitter 820 may transmit signals generated by other components of the device. In some examples, the transmitter 820 may be collocated with a receiver 810 in a transceiver module. For example, the transmitter 820 may be an example of aspects of the transceiver 1135 as described with reference to FIG. 11. The transmitter 820 may utilize a single antenna or a set of antennas.

Figure 9:
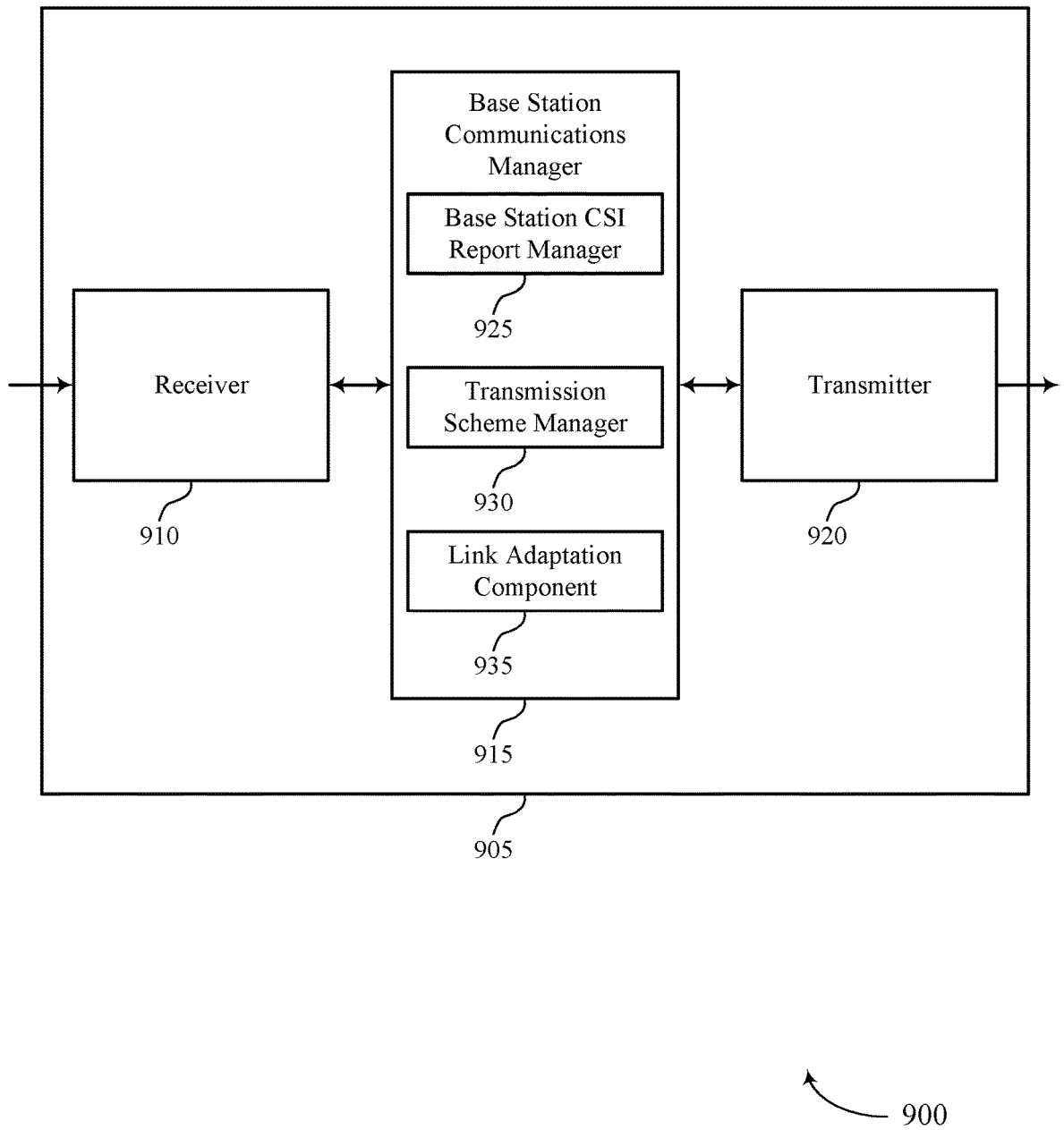

FIG. 9 shows a block diagram 900 of a wireless device 905 in accordance with aspects of the present disclosure. Wireless device 905 may be an example of aspects of a wireless device 805 or a base station 105 as described with reference to FIG. 8. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to CSI feedback for semi-open-loop and open-loop schemes, etc.). Information may be passed on to other components of the device. The receiver 910 may be an example of aspects of the transceiver 1135 as described with reference to FIG. 11. The receiver 910 may utilize a single antenna or a set of antennas.

Base station communications manager 915 may be an example of aspects of the base station communications manager 1115 as described with reference to FIG. 11. Base station communications manager 915 may also include base station CSI report manager 925, transmission scheme manager 930, and link adaptation component 935.

Base station CSI report manager 925 may receive CQI in a CSI report, the CQI based on at least one of a time offset value between two or more antenna ports and a precoder cycling granularity value. In some cases, the CQI may be based on a PMI reporting scheme and the time offset value and the precoder cycling granularity value, and the CSI report may include a RI, a PMI, the time offset value, the precoder cycling granularity value, or a combination thereof. In some cases, the time offset value or the precoder cycling granularity value may be jointly coded within the CSI report. In some cases, the time offset value or the precoder cycling granularity value may be jointly coded with the RI within the CSI report. In some cases, receiving the CQI may include receiving the CQI having a first precoder applied for a first RBG and a second precoder applied for a second RBG, where a size of the first RBG and a size of the second RBG are equal to the precoder cycling granularity value. In some cases, base station CSI report manager 925 may receive at least one of the time offset value or the precoder cycling granularity value, where the CQI may be assumed to be associated with the received time offset value or the received precoder cycling granularity value.

Transmission scheme manager 930 may determine a transmission scheme used for generating the CQI based on at least one of the time offset value or the precoder cycling granularity value. In some cases, the transmission scheme may include a first transmission scheme or a second transmission scheme. In some cases, the first transmission scheme includes a closed-loop transmission scheme and the second transmission scheme includes a semi-open-loop transmission scheme or an open-loop transmission scheme. Determining the transmission scheme used for generating the CQI may include identifying that the time offset value is greater than zero and the precoder cycling granularity value is equal to a non-cycling indicator, where the determined transmission scheme is the second transmission scheme. In some examples, determining the transmission scheme used for generating the CQI may include identifying that the time offset value is equal to zero and the precoder cycling granularity value is not equal to a non-cycling indicator, where the determined transmission scheme is the second transmission scheme. In some cases, generating the CQI may include determining a PMI reporting scheme, where the PMI reporting scheme may include full PMI reporting, partial PMI reporting, or no PMI reporting, and deriving the CQI based on the determined PMI reporting scheme. In some cases, the two or more antenna ports include a first group of CSI-RS ports and a second group of CSI-RS ports, and generating the CQI includes applying the time offset value to the second group of CSI-RS ports relative to the first group of CSI-RS ports.

In some examples, determining the transmission scheme used for generating the CQI may include identifying that the time offset value is greater than zero and the precoder cycling granularity value is not equal to a non-cycling indicator, where the determined transmission scheme is the second transmission scheme. In some cases, the CQI is based on a PMI reporting scheme and the time offset value and the precoder cycling granularity value. Link adaptation component 935 may perform link adaptation based on the determined transmission scheme and the CSI report.

Transmitter 920 may transmit signals generated by other components of the device. In some examples, the transmitter 920 may be collocated with a receiver 910 in a transceiver module. For example, the transmitter 920 may be an example of aspects of the transceiver 1135 as described with reference to FIG. 11. The transmitter 920 may utilize a single antenna or a set of antennas.

Figure 10:
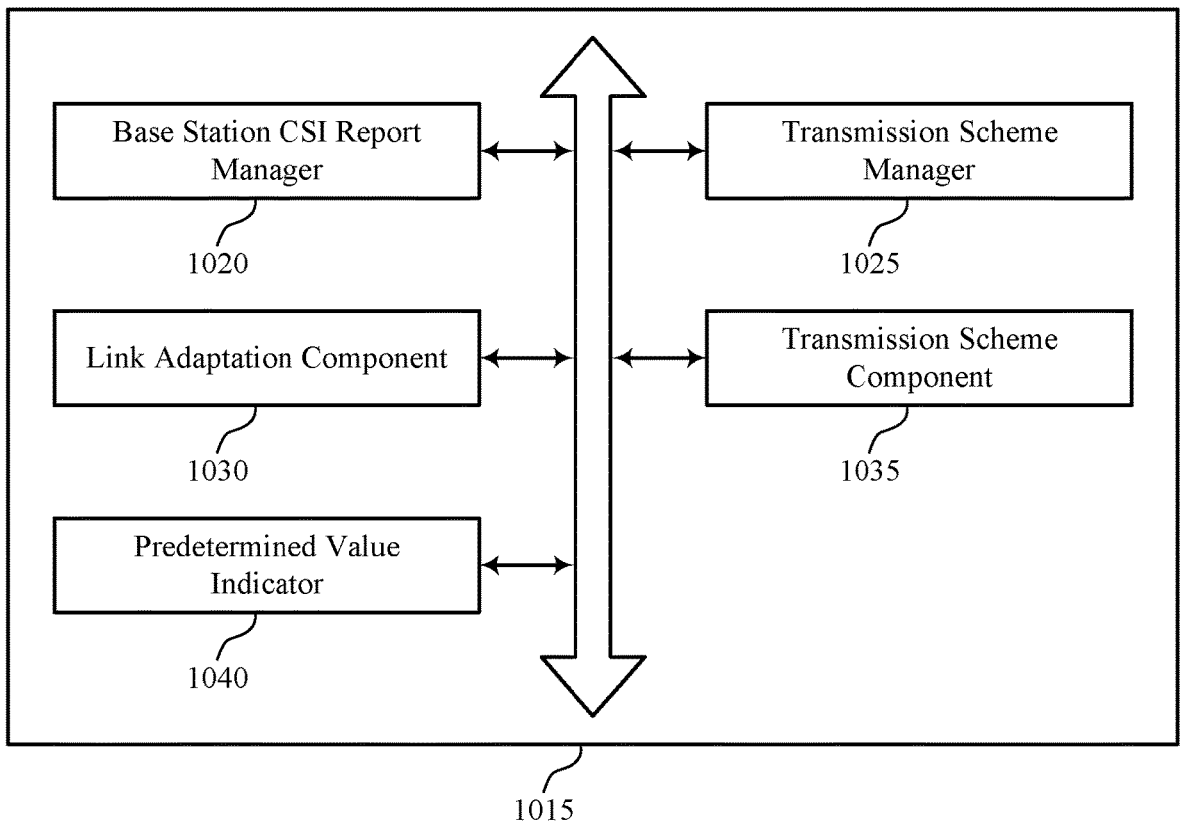
FIG. 10 shows a block diagram of a base station communications manager in accordance with aspects of the present disclosure.

FIG. 10 shows a block diagram 1000 of a base station communications manager 1015 in accordance with aspects of the present disclosure. The base station communications manager 1015 may be an example of aspects of a base station communications manager 1115 described with reference to FIGS. 8, 9, and 11. The base station communications manager 1015 may include base station CSI report manager 1020, transmission scheme manager 1025, link adaptation component 1030, transmission scheme component 1035, and predetermined value indicator 1040. Each of these modules may communicate, directly or indirectly, with one another (e.g., via one or more buses).

Base station CSI report manager 1020 may receive CQI in a CSI report, the CQI based on at least one of a time offset value between two or more antenna ports and a precoder cycling granularity value. In some cases, the CQI may be based on a PMI reporting scheme and the time offset value and the precoder cycling granularity value, and the CSI report may include a RI, a PMI, the time offset value, the precoder cycling granularity value, or a combination thereof. In some cases, the time offset value or the precoder cycling granularity value may be jointly coded within the CSI report. In some cases, the time offset value or the precoder cycling granularity value may be jointly coded with the RI within the CSI report. In some cases, receiving the CQI may include receiving the CQI having a first precoder applied for a first RBG and a second precoder applied for a second RBG, where a size of the first RBG and a size of the second RBG are equal to the precoder cycling granularity value. In some cases, base station CSI report manager 1020 may receiving at least one of the time offset value or the precoder cycling granularity value, where the CQI is assumed to be associated with the received time offset value or the received precoder cycling granularity value.

Transmission scheme manager 1025 may determine a transmission scheme used for generating the CQI based on at least one of the time offset value and the precoder cycling granularity value. In some cases, the transmission scheme may include a first transmission scheme or a second transmission scheme. In some cases, the first transmission scheme includes a closed-loop transmission scheme and the second transmission scheme includes a semi-open-loop transmission scheme or an open-loop transmission scheme. Determining the transmission scheme used for generating the CQI may include identifying that the time offset value is greater than zero and the precoder cycling granularity value is equal to a non-cycling indicator, where the determined transmission scheme is the second transmission scheme. In some examples, determining the transmission scheme used for generating the CQI may include identifying that the time offset value is equal to zero and the precoder cycling granularity value is not equal to a non-cycling indicator, where the determined transmission scheme is the second transmission scheme. In some cases, generating the CQI may include determining a PMI reporting scheme, where the PMI reporting scheme may include full PMI reporting, partial PMI reporting, or no PMI reporting, and deriving the CQI based on the determined PMI reporting scheme. In some cases, the two or more antenna ports include a first group of CSI-RS ports and a second group of CSI-RS ports, and generating the CQI includes applying the time offset value to the second group of CSI-RS ports relative to the first group of CSI-RS ports.

In some examples, determining the transmission scheme used for generating the CQI may include identifying that the time offset value is greater than zero and the precoder cycling granularity value is not equal to a non-cycling indicator, where the determined transmission scheme is the second transmission scheme, which may include SCDD and RBG level precoder cycling. In some cases, the CQI is based on a PMI reporting scheme and the time offset value and the precoder cycling granularity value. Link adaptation component 1030 may perform link adaptation based on the determined transmission scheme and the CSI report.

Transmission scheme component 1035 may identify that the time offset value is equal to zero and the precoder cycling granularity value is equal to a non-cycling indicator, where the determined transmission scheme is the first transmission scheme. Predetermined value indicator 1040 may transmit an indication of a predetermined set of time offset values and an indication of a predetermined set of precoder cycling granularity values via a MAC CE, or an RRC message, or DCI. In some cases, the predetermined set of precoder cycling granularity values includes multiples of a number of RBs and a non-cycling indicator, and a maximum multiple of the number of RBs is less than or equal to a smallest frequency granularity for CSI feedback and the non-cycling indicator is equal to zero. In some examples, the predetermined set of precoder cycling granularity values include a multiple of a number of RB for CSI feedback or a portion of the number of RBs for CSI feedback. In some cases, predetermined value indicator 1040 may configure (e.g., directly to the UE) at least one of the time offset value or the precoder cycling granularity value via a MAC CE, or a RRC message, or DCI. For instance, a base station 105 may directly configure parameters to the UE 115, then the UE 115 may generate CSI using the configuration, and subsequently report the CSI without transmitting the time offset and precoder cycling granularity. In other examples, the base station 105 may configure a predefined set of parameters for the UE 115, then the UE 115 may select the preferred parameters and generate the CSI. The UE 115 may then report the CSI together with the preferred parameter selected from the set of parameters. Accordingly, the base station 105 may know which parameters the CSI is associated with.

Figure 11:
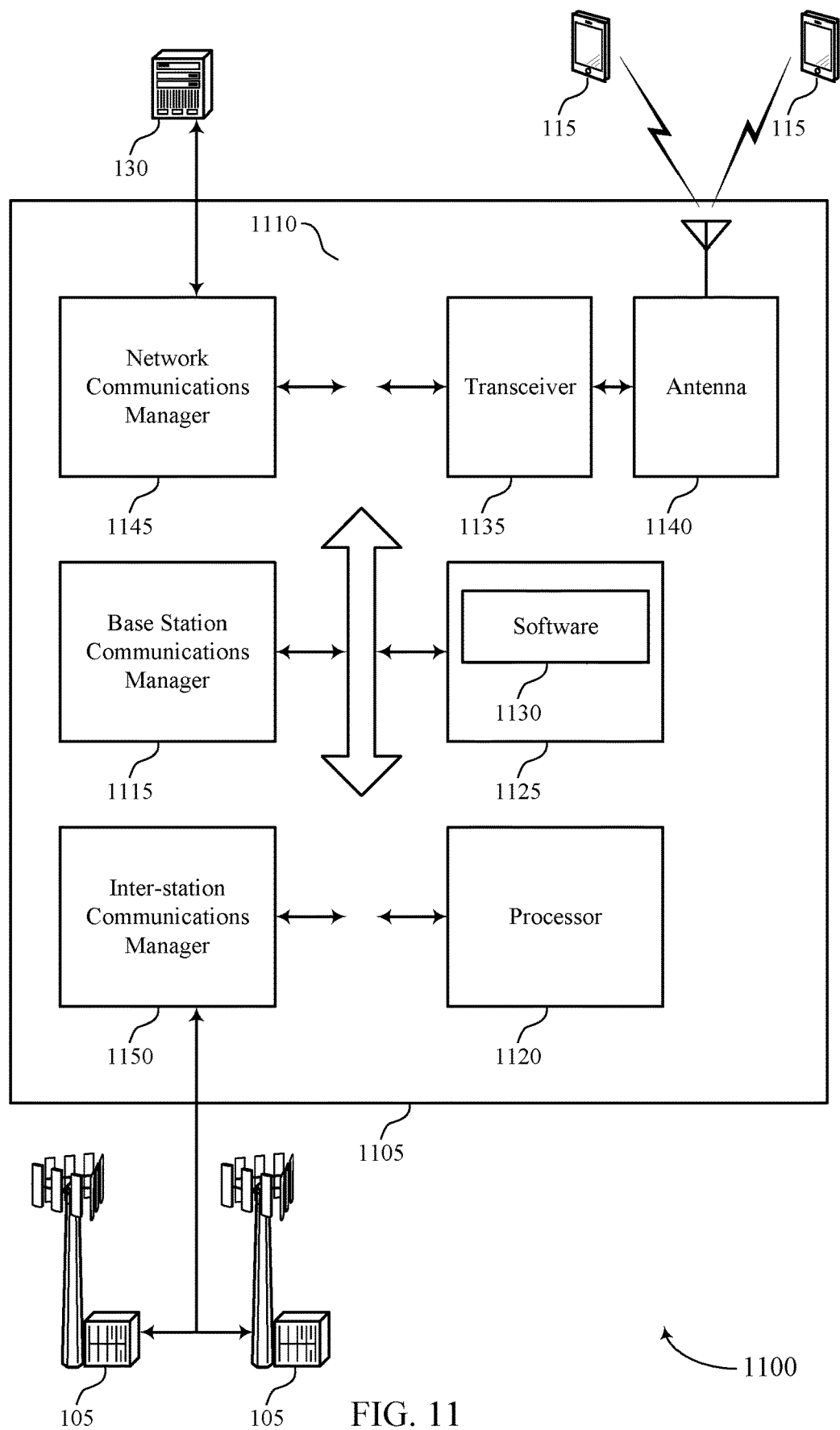
FIG. 11 illustrates a block diagram of a system including a device in accordance with aspects of the present disclosure.

FIG. 11 shows a diagram of a system 1100 including a device 1105 in accordance with aspects of the present disclosure. Device 1105 may be an example of or include the components of base station 105, for example, as described with reference to FIG. 1. Device 1105 may include components for bi-directional voice and data communications including components for transmitting and receiving communications, including base station communications manager 1115, processor 1120, memory 1125, software 1130, transceiver 1135, antenna 1140, network communications manager 1145, and inter-station communications manager 1150. These components may be in electronic communication via one or more buses (e.g., bus 1110). Device 1105 may communicate wirelessly with one or more UEs 115.

Processor 1120 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting CSI feedback for semi-open-loop and open-loop schemes).

Memory 1125 may include RAM and ROM. The memory 1125 may store computer-readable, computer-executable software 1130 including instructions that, when executed, cause the processor to perform various functions described herein. In some cases, the memory 1125 may contain, among other things, a BIOS which may control basic hardware or software operation such as the interaction with peripheral components or devices.

Software 1130 may include code to implement aspects of the present disclosure, including code to support CSI feedback for semi-open-loop and open-loop schemes. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions. Network communications manager 1145 may manage communications with the core network (e.g., via one or more wired backhaul links). For example, the network communications manager 1145 may manage the transfer of data communications for client devices, such as one or more UEs 115.

Inter-station communications manager 1150 may manage communications with other base station 105, and may include a controller or scheduler for controlling communications with UEs 115 in cooperation with other base stations 105. For example, the inter-station communications manager 1150 may coordinate scheduling for transmissions to UEs 115 for various interference mitigation techniques such as beamforming or joint transmission. In some examples, inter-station communications manager 1150 may provide an X2 interface within an LTE/LTE-A wireless communications network technology to provide communication between base stations 105.

Figure 12:
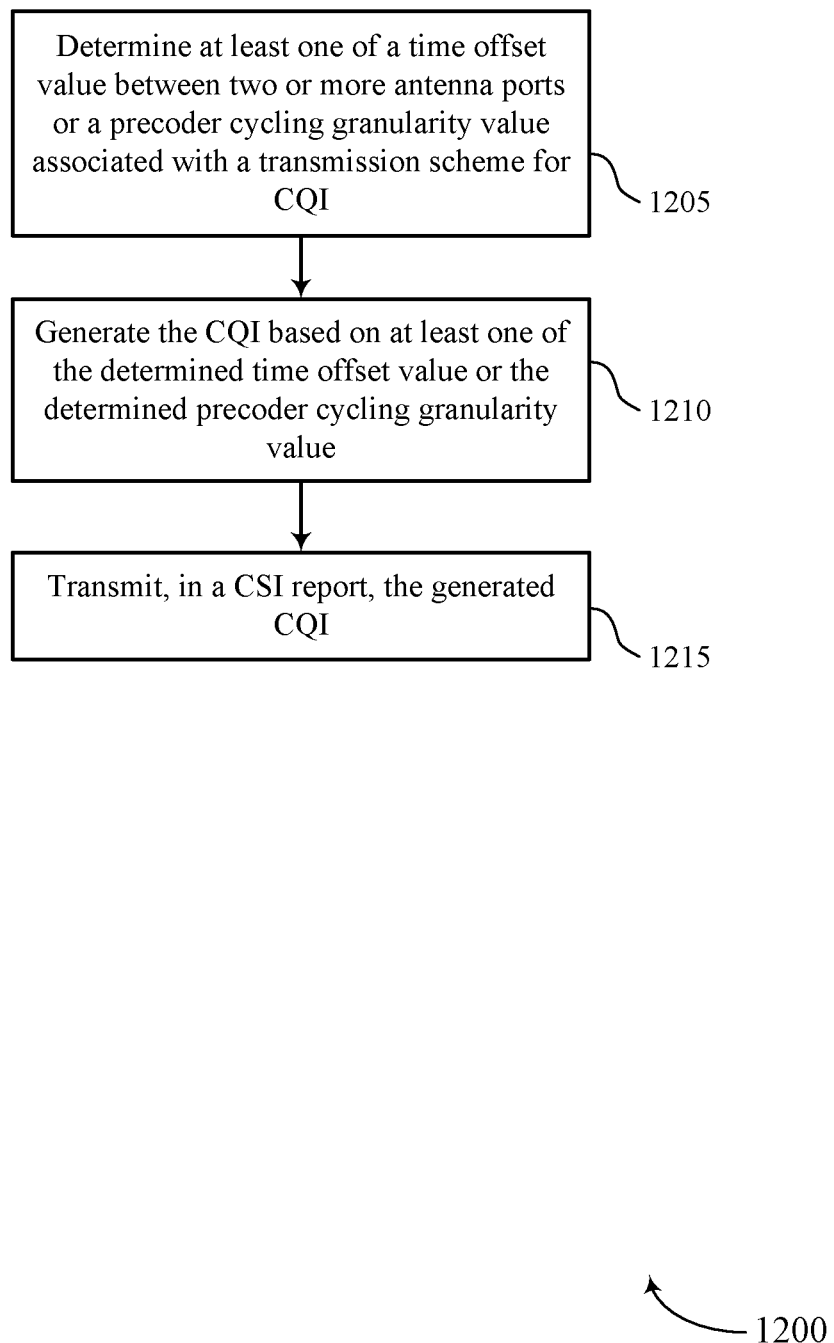
FIGS. 12 through 16 show flowcharts illustrating methods in accordance with aspects of the present disclosure.

FIG. 12 shows a flowchart illustrating a method 1200 in accordance with aspects of the present disclosure. The operations of method 1200 may be implemented by a UE 115 or its components as described herein. For example, the operations of method 1200 may be performed by a UE communications manager as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At block 1205 the UE 115 may determine at least one of a time offset value between two or more antenna ports or a precoder cycling granularity value associated with a transmission scheme for CQI. The operations of block 1205 may be performed according to the methods described herein. In certain examples, aspects of the operations of block 1205 may be performed by a time offset and precoder granularity manager as described with reference to FIGS. 4 through 7.

At block 1210 the UE 115 may generate the CQI based on at least one of the determined time offset value or the determined precoder cycling granularity value. The operations of block 1210 may be performed according to the methods described herein. In certain examples, aspects of the operations of block 1210 may be performed by a CQI component as described with reference to FIGS. 4 through 7.

At block 1215 the UE 115 may transmit, in a CSI report, the generated CQI. The operations of block 1215 may be performed according to the methods described herein. In certain examples, aspects of the operations of block 1215 may be performed by a UE CSI report manager as described with reference to FIGS. 4 through 7.

Figure 13:
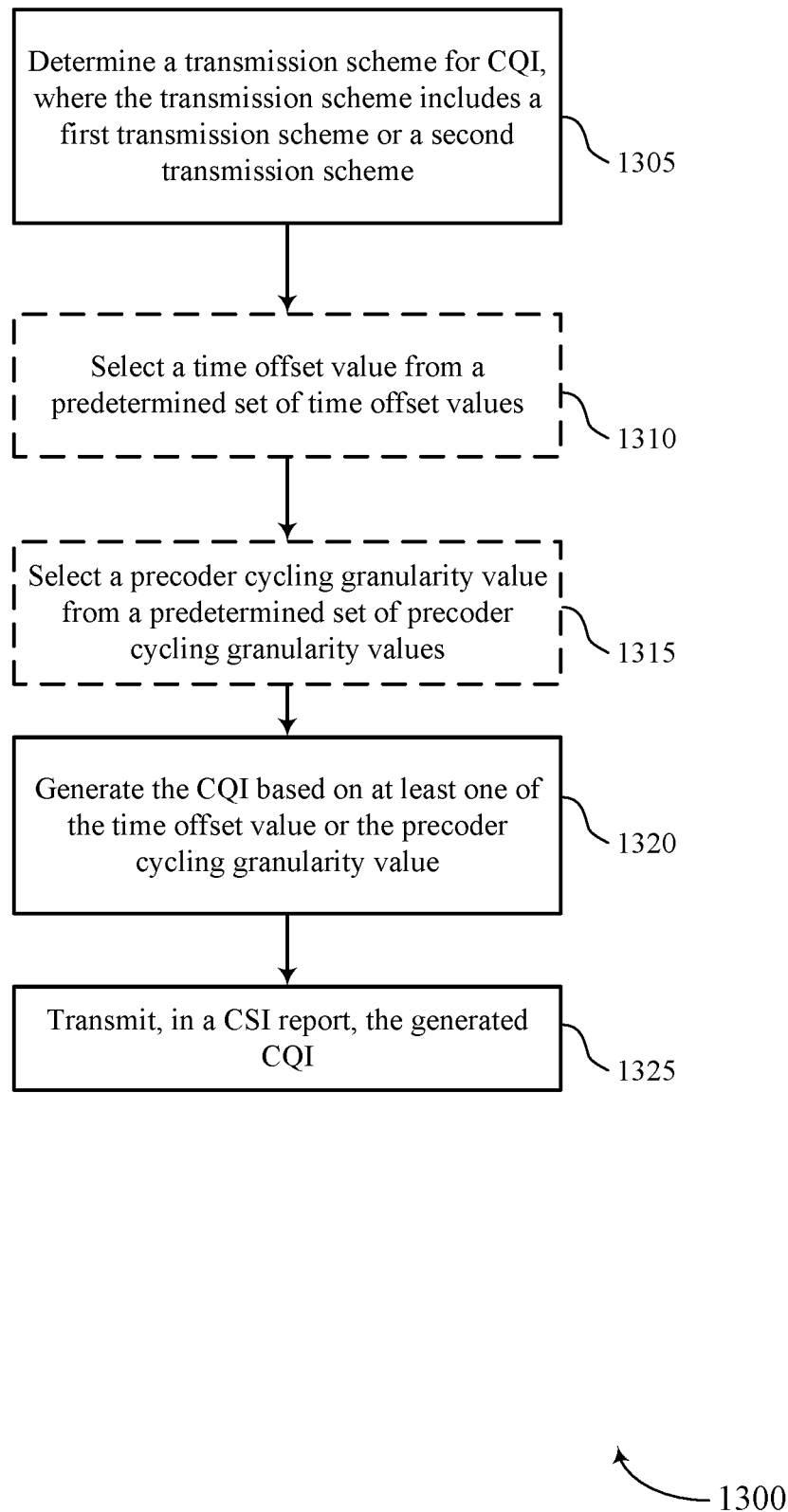

FIG. 13 shows a flowchart illustrating a method 1300 in accordance with aspects of the present disclosure. The operations of method 1300 may be implemented by a UE 115 or its components as described herein. For example, the operations of method 1300 may be performed by a UE communications manager as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At block 1305 the UE 115 may determine a transmission scheme for CQI, where the transmission scheme includes a first transmission scheme or a second transmission scheme. The operations of block 1305 may be performed according to the methods described herein. In certain examples, aspects of the operations of block 1305 may be performed by a transmission scheme component as described with reference to FIGS. 4 through 7.

At block 1310 the UE 115 may optionally select a time offset value from a predetermined set of time offset values, where the time offset value is associated with the determined transmission scheme. The operations of block 1310 may be performed according to the methods described herein. In certain examples, aspects of the operations of block 1310 may be performed by a time offset and precoder granularity manager as described with reference to FIGS. 4 through 7.

At block 1315 the UE 115 may optionally select a precoder cycling granularity value from a predetermined set of precoder cycling granularity values, where the precoder cycling granularity value is associated with the determined transmission scheme. The operations of block 1315 may be performed according to the methods described herein. In certain examples, aspects of the operations of block 1315 may be performed by a time offset and precoder granularity manager as described with reference to FIGS. 4 through 7.

At block 1320 the UE 115 may generate the CQI based on at least one of the time offset value and the precoder cycling granularity value. The operations of block 1320 may be performed according to the methods described herein. In certain examples, aspects of the operations of block 1320 may be performed by a UE CSI report manager as described with reference to FIGS. 4 through 7.

At block 1325 the UE 115 may transmit, in a CSI report, the generated CQI. The operations of block 1325 may be performed according to the methods described herein. In certain examples, aspects of the operations of block 1325 may be performed by a time offset and precoder granularity manager as described with reference to FIGS. 4 through 7.

Figure 14:
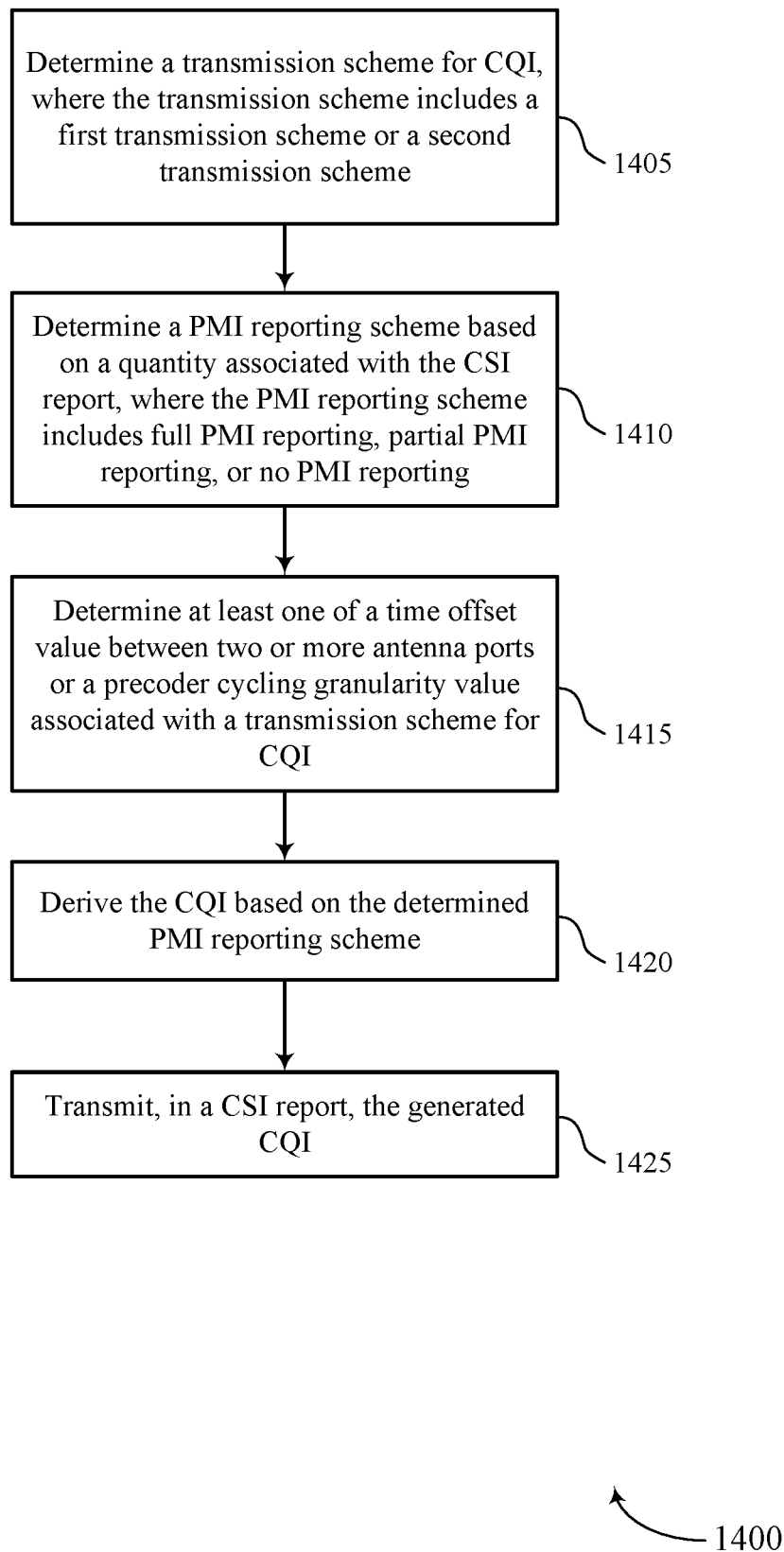

FIG. 14 shows a flowchart illustrating a method 1400 in accordance with aspects of the present disclosure. The operations of method 1400 may be implemented by a UE 115 or its components as described herein. For example, the operations of method 1400 may be performed by a UE communications manager as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may determine a transmission scheme for CQI, where the transmission scheme comprises a first transmission scheme or a second transmission scheme. The operations of block 1405 may be performed according to the methods described herein. In certain examples, aspects of the operations of block 1405 may be performed by a transmission scheme component as described with reference to FIGS. 4 through 7.

At block 1410 the UE 115 may determine a PMI reporting scheme based on a quantity associated with the CSI report, where the PMI reporting scheme may include full PMI reporting, partial PMI reporting, or no PMI reporting. The operations of block 1410 may be performed according to the methods described herein. In certain examples, aspects of the operations of block 1410 may be performed by a CQI component as described with reference to FIGS. 4 through 7.

At block 1415 the UE 115 may determine at least one of a time offset value between two or more antenna ports or a precoder cycling granularity value associated with a transmission scheme for CQI. The operations of block 1415 may be performed according to the methods described herein. In certain examples, aspects of the operations of block 1415 may be performed by a time offset and precoder granularity manager as described with reference to FIGS. 4 through 7.

At block 1420 the UE 115 may derive the CQI based on the determined PMI reporting scheme. The operations of block 1420 may be performed according to the methods described herein. In certain examples, aspects of the operations of block 1420 may be performed by a CQI component as described with reference to FIGS. 4 through 7.

At block 1425 the UE 115 may transmit, in a CSI report, the generated CQI. The operations of block 1425 may be performed according to the methods described herein. In certain examples, aspects of the operations of block 1425 may be performed by a UE CSI report manager as described with reference to FIGS. 4 through 7.

Figure 15:
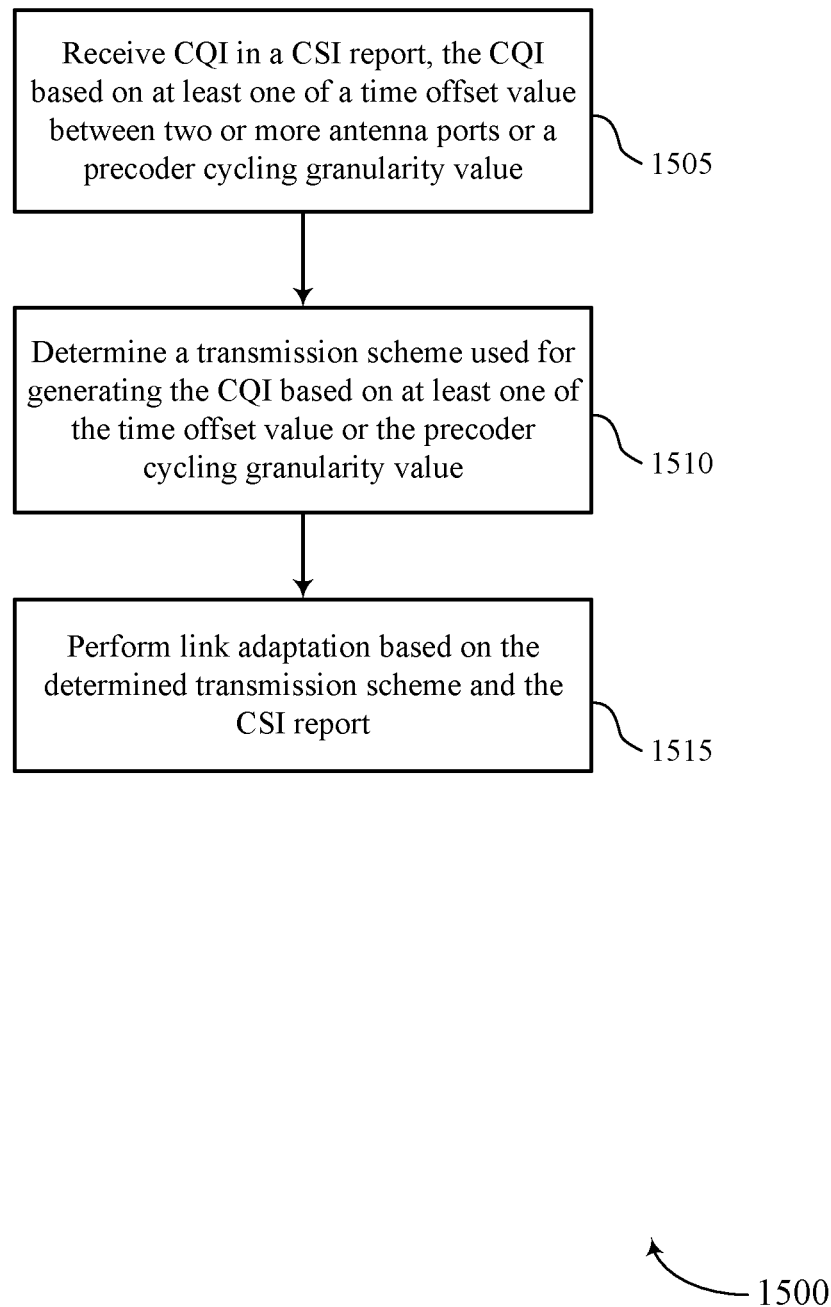

FIG. 15 shows a flowchart illustrating a method 1500 in accordance with aspects of the present disclosure. The operations of method 1500 may be implemented by a base station 105 or its components as described herein. For example, the operations of method 1500 may be performed by a base station communications manager as described with reference to FIGS. 8 through 11. In some examples, a base station 105 may execute a set of codes to control the functional elements of the device to perform the functions described below. Additionally or alternatively, the base station 105 may perform aspects of the functions described below using special-purpose hardware.

At block 1505 the base station 105 may receive CQI in a CSI report, the CQI based on at least one of a time offset value between two or more antenna ports or a precoder cycling granularity value. The operations of block 1505 may be performed according to the methods described herein. In certain examples, aspects of the operations of block 1505 may be performed by a base station CSI report manager as described with reference to FIGS. 8 through 11.

At block 1510 the base station 105 may determine a transmission scheme used for generating the CQI based on at least one of the time offset value or the precoder cycling granularity value. The operations of block 1510 may be performed according to the methods described herein. In certain examples, aspects of the operations of block 1510 may be performed by a transmission scheme manager as described with reference to FIGS. 8 through 11.

At block 1515 the base station 105 may perform link adaptation based on the determined transmission scheme and the CSI report. The operations of block 1515 may be performed according to the methods described herein. In certain examples, aspects of the operations of block 1515 may be performed by a link adaptation component as described with reference to FIGS. 8 through 11.

Figure 16:
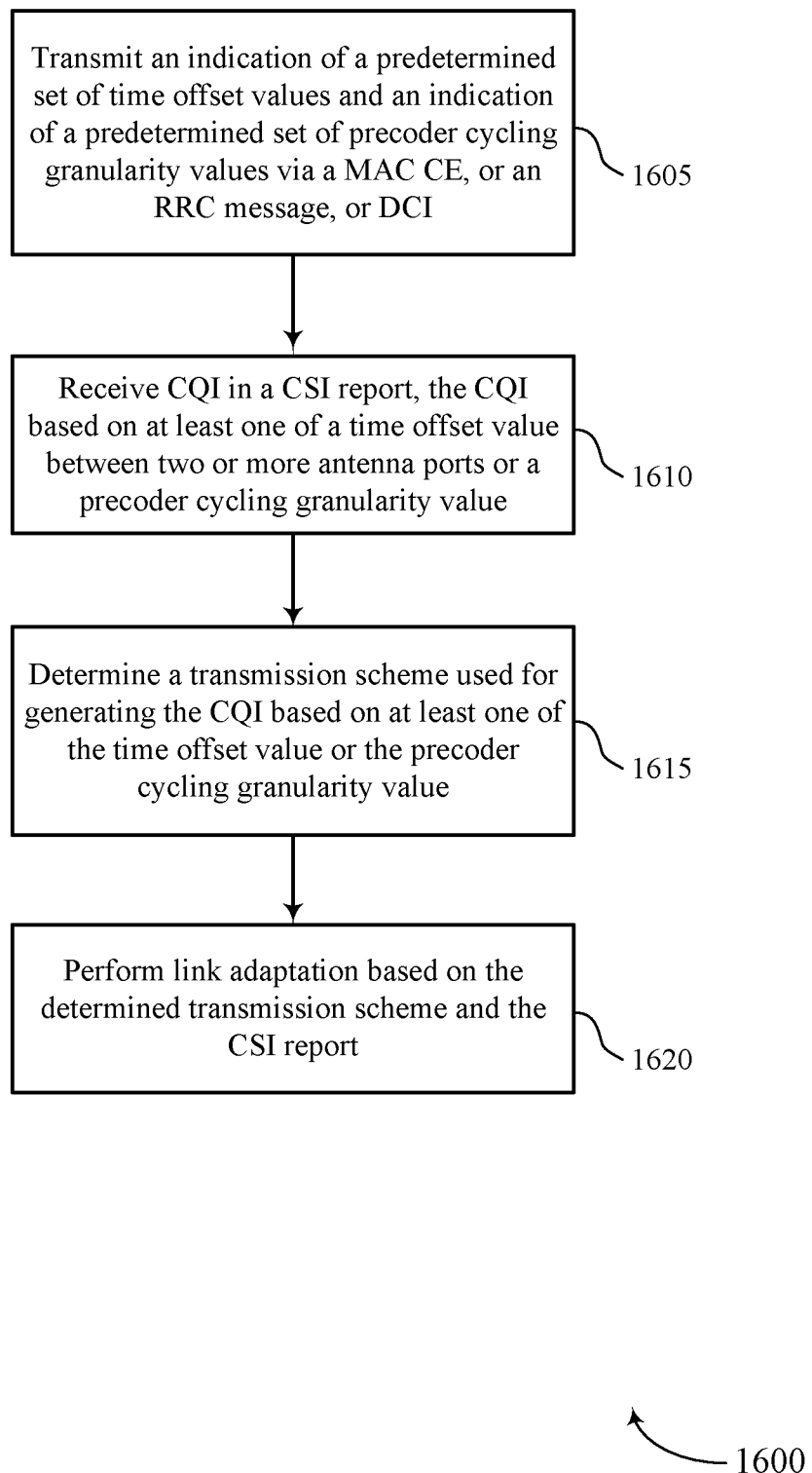

FIG. 16 shows a flowchart illustrating a method 1600 in accordance with aspects of the present disclosure. The operations of method 1600 may be implemented by a base station 105 or its components as described herein. For example, the operations of method 1600 may be performed by a base station communications manager as described with reference to FIGS. 8 through 11. In some examples, a base station 105 may execute a set of codes to control the functional elements of the device to perform the functions described below. Additionally or alternatively, the base station 105 may perform aspects of the functions described below using special-purpose hardware.

At block 1605 the base station 105 may transmit an indication of a predetermined set of time offset values and an indication of a predetermined set of precoder cycling granularity values via a MAC CE, or an RRC message, or DCI. The operations of block 1605 may be performed according to the methods described herein. In certain examples, aspects of the operations of block 1605 may be performed by a predetermined value indicator as described with reference to FIGS. 8 through 11.

At block 1610 the base station 105 may receive CQI in a CSI report, the CQI based on at least one of a time offset value between two or more antenna ports or a precoder cycling granularity value. The operations of block 1610 may be performed according to the methods described herein. In certain examples, aspects of the operations of block 1610 may be performed by a base station CSI report manager as described with reference to FIGS. 8 through 11.

At block 1615 the base station 105 may determine a transmission scheme used for generating the CQI based on at least one of the time offset value or the precoder cycling granularity value. The operations of block 1615 may be performed according to the methods described herein. In certain examples, aspects of the operations of block 1615 may be performed by a transmission scheme manager as described with reference to FIGS. 8 through 11.

At block 1620 the base station 105 may perform link adaptation based on the determined transmission scheme and the CSI report. The operations of block 1620 may be performed according to the methods described herein. In certain examples, aspects of the operations of block 1620 may be performed by a link adaptation component as described with reference to FIGS. 8 through 11.

In some examples, aspects from two or more of the described methods may be combined. It should be noted that the methods are just example implementations, and that the operations of the methods be rearranged or otherwise modified such that other implementations are possible.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 as described with reference to FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication, comprising:
a processor;
memory in electronic communication with the processor; and
instructions stored in the memory and executable by the processor to cause the apparatus to:
determine a precoding matrix indicator (PMI) reporting scheme based at least in part on a quantity associated with a channel state information (CSI) report, wherein the PMI reporting scheme comprises partial PMI reporting;
determine a number of resource blocks (RBs), for which a same precoder is used, associated with a transmission scheme for channel quality information (CQI);
generate the CQI based at least in part on the determined number of RBs and the determined PMI reporting scheme; and
transmit, in the CSI report, the generated CQI.

2. The apparatus of claim 1, wherein the processor is further configured to:
determine that the transmission scheme for CQI comprises a second transmission scheme different than a first transmission scheme based at least in part on the number of RBs.

3. The apparatus of claim 1, wherein the processor is further configured to:
apply a first precoder for a first resource block group (RBG) and a second precoder for a second RBG, wherein a size of the first RBG and a size of the second RBG are equal to the determined number of RBs.

4. A method for wireless communications, comprising:
determining a precoding matrix indicator (PMI) reporting scheme based at least in part on a quantity associated with a channel state information (CSI) report, wherein the PMI reporting scheme comprises partial PMI reporting;
determining a number of resource blocks (RBs), for which a same precoder is used, associated with a transmission scheme for channel quality information (CQI);
generating the CQI based at least in part on the determined number of RBs and the determined PMI reporting scheme; and
transmitting, in the CSI report, the generated CQI.

5. The method of claim 4, further comprising:
determining that the transmission scheme for CQI comprises a second transmission scheme different than a first transmission scheme based at least in part on the number of RBs.

6. The method of claim 4, further comprising:
applying a first precoder for a first resource block group (RBG) and a second precoder for a second RBG, wherein a size of the first RBG and a size of the second RBG are equal to the determined number of RBs.

7. An apparatus for wireless communication, comprising:
means for determining a precoding matrix indicator (PMI) reporting scheme based at least in part on a quantity associated with a channel state information (CSI) report, wherein the PMI reporting scheme comprises partial PMI reporting;
means for determining a number of resource blocks (RBs), for which a same precoder is used, associated with a transmission scheme for channel quality information (CQI);
means for generating the CQI based at least in part on the determined number of RBs and the determined PMI reporting scheme; and
means for transmitting, in the CSI report, the generated CQI.

8. The apparatus of claim 7, further comprising:
means for determining that the transmission scheme for CQI comprises a second transmission scheme different than a first transmission scheme based at least in part on the number of RBs.

9. The apparatus of claim 7, further comprising:
means for applying a first precoder for a first resource block group (RBG) and a second precoder for a second RBG, wherein a size of the first RBG and a size of the second RBG are equal to the determined number of RBs.

10. A non-transitory computer-readable medium storing code for wireless communications, the code comprising instructions executable by a processor to:
determine a precoding matrix indicator (PMI) reporting scheme based at least in part on a quantity associated with a channel state information (CSI) report, wherein the PMI reporting scheme comprises partial PMI reporting;
determine a number of resource blocks (RBs), for which a same precoder is used, associated with a transmission scheme for channel quality information (CQI);
generate the CQI based at least in part on the determined number of RBs and the determined PMI reporting scheme; and
transmit, in the CSI report, the generated CQI.

11. The non-transitory computer-readable medium of claim 10, wherein the instructions are executable to:
determine that the transmission scheme for CQI comprises a second transmission scheme different than a first transmission scheme based at least in part on the number of RBs.

12. The non-transitory computer-readable medium of claim 10, wherein the instructions are executable to:
apply a first precoder for a first resource block group (RBG) and a second precoder for a second RBG, wherein a size of the first RBG and a size of the second RBG are equal to the determined number of RBs.

* * * * *